United States Patent
Colombo et al.

(10) Patent No.: US 11,915,008 B2
(45) Date of Patent: Feb. 27, 2024

(54) PROCESSING SYSTEM, RELATED INTEGRATED CIRCUIT, DEVICE AND METHOD

(71) Applicants: STMicroelectronics S.r.l., Agrate Brianza (IT); STMicroelectronics Application GMBH, Aschheim-Dornach (DE)

(72) Inventors: Roberto Colombo, Munich (DE); Nicolas Bernard Rene Grossier, Oreno di Vimercate (IT); Fabio Enrico Carlo Disegni, Spino d'adda (IT)

(73) Assignees: ST Microelectronics S.r.l., Agrate Brianza (IT); STMicroelectronics Application GMBH, Aschheim-Dornach (DE)

(*) Notice: Subject to any disclaimer, the term of this patent is extended or adjusted under 35 U.S.C. 154(b) by 174 days.

(21) Appl. No.: 17/654,537

(22) Filed: Mar. 11, 2022

(65) Prior Publication Data

US 2022/0308892 A1 Sep. 29, 2022

(30) Foreign Application Priority Data

Mar. 26, 2021 (IT) .................. 102021000007475

(51) Int. Cl.
*G06F 9/44* (2018.01)
*G06F 9/4401* (2018.01)
*G06F 9/30* (2018.01)

(52) U.S. Cl.
CPC ........ *G06F 9/4403* (2013.01); *G06F 9/30101* (2013.01)

(58) Field of Classification Search
CPC ................ G06F 9/4403; G06F 9/30101
See application file for complete search history.

(56) References Cited

U.S. PATENT DOCUMENTS

2020/0348890 A1 11/2020 Colombo

FOREIGN PATENT DOCUMENTS

EP 3432190 A1 1/2019

OTHER PUBLICATIONS

Wiersma, Nils et al., "Safety != Security, On the Resilience of ASIL-D Certified Microcontrollers against Fault Injection Attacks," 2017 Workshop on Fault Diagnosis and Tolerance in Cryptography (FDTC), IEEE, Sep. 25, 2017, 8 pages.

*Primary Examiner* — Zahid Choudhury
(74) *Attorney, Agent, or Firm* — Slater Matsil, LLP

(57) ABSTRACT

In an embodiment, a hardware configuration circuit reads and decodes an encoded life-cycle data and provides the decoded life-cycle data to a hardware circuit. A reset circuit monitors an external reset signal received via a reset terminal and, in response to determining that the external reset signal has a first logic level, executes a reset, a configuration, and a wait phase. The reset circuit waits until the external reset signal has a second logic level. A communication interface is activated during the wait phase and configured to receive a request. A hardware verification circuit generates a life-cycle advancement request signal when the request includes a given reference password and a reset circuit is in the wait phase. A write circuit writes a bit of the encoded life-cycle data stored in a non-volatile memory when the life-cycle advancement request signal is set, advancing the life-cycle to a given predetermined life-cycle stage.

20 Claims, 6 Drawing Sheets

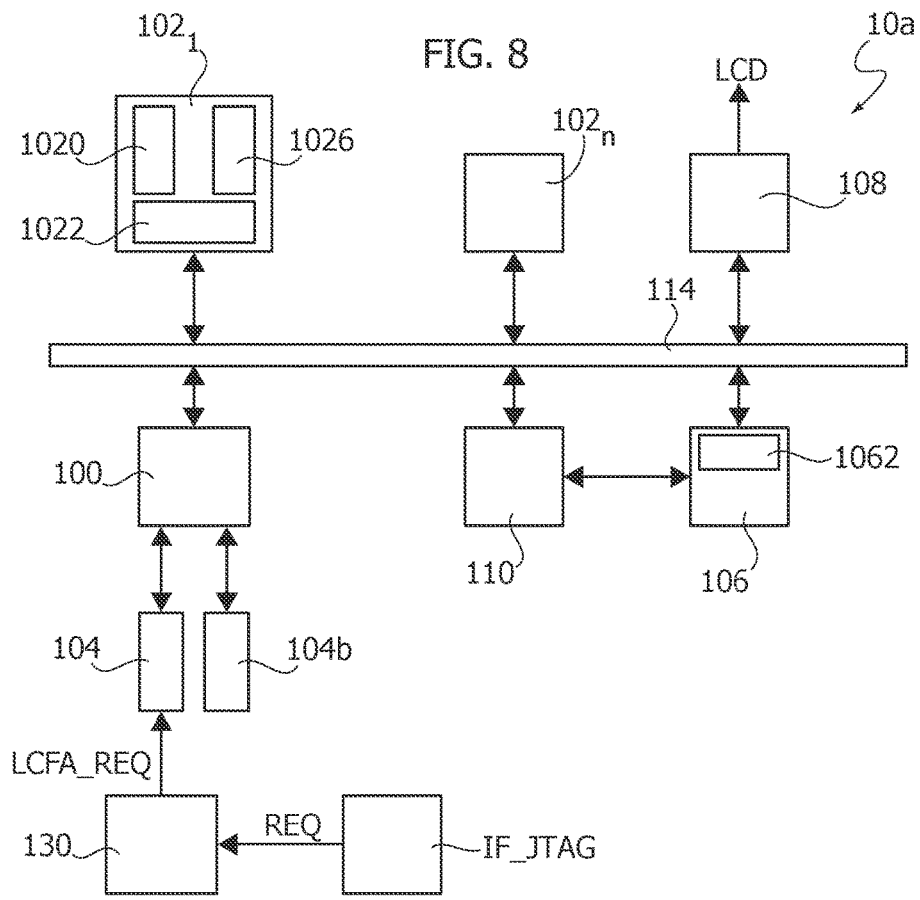
FIG. 8
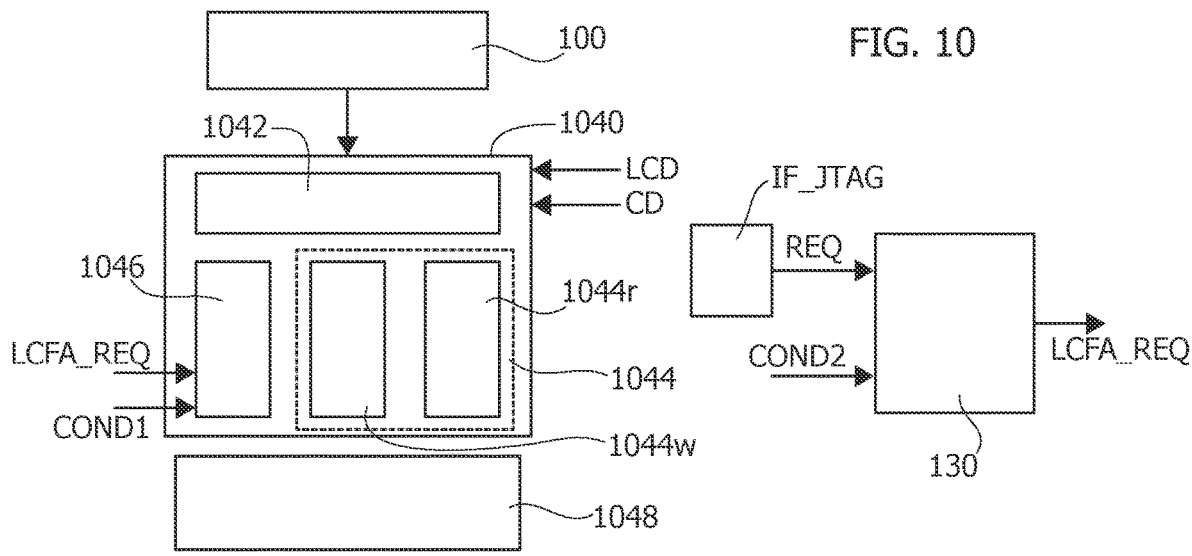
FIG. 9
FIG. 10

PROCESSING SYSTEM, RELATED INTEGRATED CIRCUIT, DEVICE AND METHOD

CROSS-REFERENCE TO RELATED APPLICATIONS

This application claims priority to Italian Patent Application No. 102021000007475, filed on Mar. 26, 2021, which application is hereby incorporated by reference herein in its entirety.

TECHNICAL FIELD

The present disclosure generally relates to failure analysis and, in particular embodiments, to the failure analysis of micro-controllers.

BACKGROUND

FIG. 1 shows a typical electronic system, such as the electronic system of a vehicle, having processing systems 10. The processing systems 10 can be embedded systems or integrated circuits (e.g., a Field Programmable Gate Array (FPGA), a Digital Signal Processor (DSP) or micro-controllers (e.g., dedicated to the automotive market).

In FIG. 1 three processing systems 101, 102, and 103 are shown to be connected through a suitable communication system 20. The communication system may include a vehicle control bus, such as a Controller Area Network (CAN) bus, and possibly a multimedia bus, such as a Media Oriented Systems Transport (MOST) bus, connected to the vehicle control bus via a gateway.

Typically, the processing systems 10 are located at different positions of the vehicle and may include, for example, an Engine Control Unit, a Transmission Control Unit (TCU), an Anti-lock Braking System (ABS), a Body Control Module (BCM), a navigation, or a multimedia audio system. Accordingly, one or more of the processing systems 10 may also implement real-time control and regulation functions. These processing systems are usually identified as Electronic Control Units.

FIG. 2 shows a circuit diagram of a digital processing system 10, such as a micro-controller, which may be used as any of the processing systems 10 of FIG. 1.

In the example considered, the processing system 10 includes a microprocessor 102, usually the Central Processor (CPU), programmed via software instructions. Usually, the software executed by the microprocessor 102 is stored in a non-volatile program memory 104, such as a Flash memory or EEPROM. Thus, the memory 104 is configured to store the firmware of the processor 102. The firmware includes the software instructions to be executed by the microprocessor 102. Generally, the non-volatile memory 104 may also be used to store other data, such as configuration data (e.g., calibration data).

The microprocessor 102 usually has also associated a volatile memory 104b, such as a Random-Access-Memory (RAM). For example, memory 104b may be used to store temporary data.

As shown in FIG. 2, usually, the communication with the memories 104 or 104b is performed via one or more memory controllers 100. The memory controller(s) 100 may be integrated into the microprocessor 102 or connected to the microprocessor 102 via a communication channel, such as a system bus of the processing system 10. Similarly, the memories 104 or 104b may be integrated with the microprocessor 102 in a single integrated circuit, or the memories 104 or 104b may be in the form of a separate integrated circuit and connected to the microprocessor 102 (e.g., via the traces of a printed circuit board).

In the example considered, the microprocessor 102 may have associated one or more (hardware) resources/peripherals 106 selected from the group of one or more communication interfaces IF (e.g., for exchanging data) via the communication system 20, such as a Universal asynchronous receiver/transmitter (UART), Serial Peripheral Interface Bus (SPI), Inter-Integrated Circuit (I2C), Controller Area Network (CAN) bus, or Ethernet interface, or a debug interface; one or more analog-to-digital converters AD or digital-to-analog converters DA; one or more dedicated digital components DC, such as hardware timers or counters, or a cryptographic co-processor; one or more analog components AC, such as comparators, sensors, such as a temperature sensor, etc.; or one or more mixed signal components MSC, such as a PWM (Pulse-Width Modulation) driver.

Generally, a dedicated digital components DC may also correspond to an FPGA integrated into the processing system 10. For example, in this case, memory 104 may also include the program data for such an FPGA.

Accordingly, the digital processing system 10 may support different functionalities. For example, the behavior of the microprocessor 102 is determined by the firmware stored in the memory 104 (e.g., the software instructions to be executed by a microprocessor 102 of a micro-controller 10). Thus, the same hardware (micro-controller) can be used for different applications by installing a different firmware.

In this respect, future generations of such processing systems 10 (e.g., micro-controllers adapted to be used in automotive applications) are expected to exhibit an increase in complexity, mainly due to the increasing number of requested functionalities (new protocols, new features, etc.) and to the tight constraints of execution conditions (e.g., lower power consumption, increased calculation power, and speed, etc.).

For example, recently, more complex multi-core processing systems 10 have been proposed. For example, such multi-core processing systems may be used to execute (in parallel) several of the processing systems 10 shown in FIG. 1, such as several processing systems of a vehicle.

FIG. 3 shows an example of a multi-core processing system 10. Specifically, in the example considered, the processing system 10 includes a plurality of n processing cores 1021 ... 102n connected to an (on-chip) communication system 114.

For example, in the context of real-time control systems, the processing cores 1021 ... 102n may be ARM Cortex®-R52 cores. Generally, the communication system 114 may include one or more bus systems (e.g., based on the Advanced eXtensible Interface (AXI) bus architecture or a Network-on-Chip (NoC)).

For example, as shown in the example of the processing core 1021, each processing core 102 may include a microprocessor 1020 and a communication interface 1022 configured to manage the communication between the microprocessor 1020 and the communication system 114. Typically, interface 1022 is a master interface configured to forward a given (read or write) request from the microprocessor 1020 to the communication system 114 and forward an optional response from the communication system 114 to the microprocessor 1020. However, the communication interface 1022 may also include a slave interface. For example, in this way, a first microprocessor 1020 may send a request to a second microprocessor 1020 (via the communication interface 1022 of the first microprocessor, the communication system 114, and the communication interface 1022 of the second microprocessor).

Generally, each processing core 1021 . . . 102n may also include further local resources, such as one or more local memories 1026, usually identified as Tightly Coupled Memory (TCM).

As mentioned before, typically, the processing cores 1021 . . . 102n are arranged to exchange data with a non-volatile memory 104 or a volatile memory 104b. In a multi-core processing system 10, often these memories are system memories (i.e., shared for the processing cores 1021 . . . 102n). As mentioned before, each processing core 1021 . . . 102n may, however, include one or more additional local memories 1026.

For example, as shown in FIG. 3, the processing system 10 may include one or more memory controllers 100 configured to connect at least one non-volatile memory 104 and at least one volatile memory 104b to the communication system 114. As mentioned before, one or more of the memories 104 or 104b may be integrated into the integrated circuit of the processing system 10 or connected externally to the integrated circuit.

For example, the processing system 10 may include a first volatile memory 104b integrated into the integrated circuit of the processing system 10 and connected to the communication system 114 via a first memory controller 100, and a second volatile memory 104b external concerning the integrated circuit of the processing system 10 and connected to the communication system 114 via a second memory controller 100.

As mentioned before, the processing system 10 may include one or more resources 106, such as one or more communication interfaces or co-processors (e.g., a cryptographic co-processor). Resources 106 are usually connected to the communication system 114 via a respective communication interface 1062. In general, the communication interface 1062 includes at least a slave interface.

For example, in this way, a processing core 102 may send a request to a resource 106, and the resource returns given data. Generally, one or more of the communication interfaces 1062 may also include a respective master interface.

For example, such a master interface 1064 may be useful if the resource has to start communication to exchange data via (read or write) request with another circuit connected to the communication system 114, such as a resource 106 or a processing core 102.

For example, for this purpose, the communication system 114 may include an Advanced Microcontroller Bus Architecture (AMBA) High-performance Bus (AHB) and an Advanced Peripheral Bus (APB) used to connect the resources/peripherals 106 to the AMBA AHB bus.

Often such processing systems 10 also include one or more Direct Memory Access (DMA) controllers 110. For example, as shown in FIG. 3, a DMA controller 110 may be used to directly exchange data with a memory (e.g., the memory 104b), based on requests received from a resource 106. For example, in this way, a communication interface IF may directly read data (via the DMA controller 110) from the memory 104b and transmit these data without exchanging further data with a processor 102. Generally, a DMA controller 110 may communicate with the memory or memories via the communication system 114 or via one or more dedicated communication channels.

In this respect, irrespective of the complexity of the processing system 10 (e.g., with respect to the number of processing cores 102 or number and type of the resources 106), a typical product development involves several entities, such as the producer of the integrated circuit including the processing system 10, one or more hardware developers, which implement a more complex electronic circuit and one or more software developers, which write the firmware for the processing system 10.

On the one hand, this implies that the validation of the various hardware or software functionalities of each processing system 10 during the respective development stage may involve a significant portion of the overall development costs: this applies both at the company producing the processing system 10 and the customer side, where the application is developed.

On the other hand, also the hardware modules within the processing systems 10 implementing security functions are getting more and more important.

For example, this may apply to a debug interface or access to given memory locations in the non-volatile memory 104 or volatile memory 104b.

For example, various processing systems 10 provide the possibility to configure whether the access to the internal resource of the processing system 10 via a debug interface is circuited or permitted (possibly specifying whether data may only be read or also written).

For example, usually during the development stage it should be possible to control the resources of the processing system 10 with a given degree of freedom, while the processing system 10 should be configured to activate certain security functions (which may not be altered) when the processing system 10 is "in field" (i.e., running in the final application).

For example, most modern micro-controllers use solutions where the enabling of a security feature is done by programming the on/off status in non-volatile memory. These configuration data are then read during the reset phase to enable or disable the related protections (e.g., to disable the debug interface of the micro-controller). Thus, a relevant portion of the security configuration is no longer alterable after the respective configuration information has been programmed into the non-volatile memory (e.g., because, once the debug interface has been deactivated, it is also impossible to overwrite the configuration data). Accordingly, most of the security configurations, once enforced, are not alterable, and the protection is always active. Unfortunately, in this way, it is also difficult to analyses possible malfunctions of the processing system 10 occurring only in the field.

Accordingly, as also described in European Patent Application n. EP 3 413 194 A1, which is incorporated herein by reference in its entirety, various modern processing systems permit to activate the security functions of the processing systems 10 based on so-called life-cycle data LCD.

For example, as disclosed in EP 3 413 194 A1, the bit sequence LCD may indicate one of the following stages: "production" (LC1), when the processing system 10 (e.g., a micro-controller), is in the chip fabric, "customer delivery" (LC2), when the processing system 10 has been shipped to the 1st tier customer (e.g., a producer of an engine control unit), "OEM production" (LC3), when the device has been shipped to a next-level customer (e.g., a car maker), and "in field" (LC4), when the device is installed in the final product (e.g., in a car sold in the market).

Typically, the life-cycle data LCD is written such that once a certain stage is reached, it is not possible to revert it back to a previous stage, i.e., the life-cycle can only advance. Accordingly, the life-cycle data LCD is a permanent signature written into a non-volatile memory, which determines the stage of the processing system 10 during its lifetime.

For example, each life-cycle may be encoded with a respective bit sequence.

For example, as shown in FIG. 3, this bit sequence LCD may be stored to a one-time programmable memory 126.

For example, this may be implemented with a one-hot encoding in which a fuse is burned each time a given stage has been reached. In general, the life-cycle data LCD may also be stored at reserved memory locations of the non-volatile memory 104.

Accordingly, the advancing of the life-cycle to the next stage may be done by the entity who owns the device in the current life-cycle stage (e.g., chip producer will advance the life-cycle when it is shipped to the customer delivery stage; the 1st tier customer will advance the life-cycle when it is shipped to the OEM production stage, etc.).

As mentioned before, typically, an increasing number of security features of the processing system 10 are activated when advancing the life-cycle stage. Generally, such security features target the protection of several micro resources so that access to them is circuited.

For example, the life-cycle data LCD may be provided to a resource 106, such as a debug interface, which is enabled or disabled as a function of the data LCD, a memory 104 or 104b which inhibits (read or write) access to given memory address ranges, or a processing core 102, which may execute a firmware which changes operation based on the data LCD, thereby implementing a software-based protection mechanism.

This operation circuits thus possible unauthorized accesses (e.g., by a hacker), but also limits the possibility to test/analyze the device, and the most critical scenario is when a device returns due to a malfunction. In fact, to be able to analyze the failure root cause, several security layers, which could be put in place by the 1st Tier and OEM customers, need to be bypassed. This operation can be difficult for a hard-failing unit. Therefore a stage, called Failure Analysis, is usually adopted, which automatically removes some non-security critical protections, making it possible to run failure analysis tests (i.e., the life-cycle data LCD may indicate the following further stage: "failure analysis" (LC5)), when the device is shipped back (e.g., to the producer of the processing system 10 or the hardware or software developer) for diagnostic purposes.

Thus, the failure analysis stage represents a special situation because the failure analysis stage may be reached by advancing the live cycle stage, but one or more of the previously activated security mechanisms are now disabled (e.g., the debug interface is again enabled). In this respect, modern processing systems 10 may enable, once the device reaches the failure analysis stage, other protection mechanisms, like a permanent impossibility to re-use the device in a car after the failure analysis stage is started.

Accordingly, to avoid possible attacks and from a safety point of view, the entrance in the failure analysis stage has to be a well-controlled operation and should never happen accidentally.

For example, accidentally activating the failure analysis stage in a real-time electronic control system could have catastrophic consequences when the device is still active in the field.

SUMMARY

In view of the above, it is advantageous to provide solutions for programming the life-cycle stage of a processing system.

According to one or more embodiments, one or more of the above objectives is achieved by means of a processing system having the features specifically set forth in the claims that follow. Embodiments moreover concern a related integrated circuit, device, and method.

As mentioned before, various embodiments of the present disclosure relate to a processing system (e.g., implemented in an integrated circuit).

In various embodiments, the processing system includes a digital processing core including a microprocessor configured to execute software instruction. The processing system also includes a hardware circuit (e.g., a peripheral of the processing system), configured to change operation as a function of decoded life-cycle data indicating a life-cycle stage. Specifically, a non-volatile memory is configured to store encoded life-cycle data indicating a life-cycle stage. Accordingly, the processing system also includes a hardware configuration circuit configured to read the encoded life-cycle data from the non-volatile memory, generate the decoded life-cycle data by decoding the encoded life-cycle data, and provide the decoded life-cycle data to the hardware circuit.

In various embodiments, the processing system includes a reset terminal (e.g., a pad or pin of a respective integrated circuit) configured to receive an external reset signal, and a reset circuit configured to monitor the external reset signal received via the reset terminal. In various embodiments, the reset circuit is configured, in response to determining that the external reset signal has a first logic level, to execute a sequence of operations. Specifically, during a reset phase, the reset circuit generates a reset of the processing system. During a configuration phase, the reset circuit activates the hardware configuration circuit, whereby the hardware configuration circuit reads the encoded life-cycle data, decodes the encoded life-cycle data, and provides the decoded life-cycle data to the hardware circuit. During a wait phase, the reset circuit waits until the external reset signal has a second logic level. Conversely, in response to determining that the external reset signal has the second logic level, the reset circuit starts the microprocessor (i.e., the microprocessor starts to execute software instructions).

In various embodiments, the processing system includes a communication interface activated during the wait phase and configured to receive a request from an external device.

In embodiments, the communication interface may be a serial communication interface, preferably a JTAG interface.

In various embodiments, the processing system includes a hardware verification circuit. Specifically, this verification circuit is configured to verify (at least) whether the request includes a given reference password and whether the reset circuit is in the wait phase.

In various embodiments, in response to determining that the request includes a given reference password and the reset circuit is in the wait phase, the verification circuit generates a life-cycle advancement request signal indicating a request to advance the life-cycle stage indicated by the encoded life cycle data to a given predetermined life-cycle stage.

Generally, the verification circuit may also verify further conditions.

In embodiments, the processing system includes a test-mode terminal configured to receive an external test-mode signal. In this case, the verification circuit may be configured to verify whether the external test-mode signal has a given logic level and generate the life-cycle advancement request signal only when the external test-mode signal has the given logic level.

Additionally, or alternatively, the verification circuit may use an enable flag.

In embodiments, the processing system includes a plurality of configuration data clients in various embodiments, each configuration data client including a register for storing configuration data. In this case, the non-volatile memory may be configured to store also configuration data, and the hardware configuration circuit may be configured, during the configuration phase, to read the configuration data from the non-volatile memory and transmit the configuration data to the plurality of configuration data clients. Accordingly, in this case, the verification circuit may be configured to receive the enable flag from a configuration data client, verify whether the enable flag has a given logic level, and generate the life-cycle advancement request signal only when the enable flag has the given logic level.

In various embodiments, the verification circuit may be configured to receive similarly the reference password from a configuration data client.

Accordingly, in various embodiments, a write circuit of the non-volatile memory may be configured to monitor the life-cycle advancement request signal and, in response to determining that the life-cycle advancement request signal is set, write one or more bits of the encoded life-cycle data stored in the non-volatile memory, thereby advancing the life-cycle stage indicated by the encoded life cycle data to the given predetermined life-cycle stage.

In various embodiments, the processing system includes at least three registers, where the life-cycle advancement request signal is stored to this at least three registers. In this case, the write circuit may be implemented with a state-machine, such as a hardware state-machine or a further microprocessor, where the state machine is configured to read the content of the at least three registers, determine the logic level of the majority of bits of the at least three registers and, in response to determining that the majority of bits are set, write the one or more bits of the encoded life-cycle data stored in the non-volatile memory.

In embodiments, in case the state-machine is implemented with (or includes) a further microprocessor, the at least three registers may be implemented with a register interface of the further microprocessor. Accordingly, in this case, the further microprocessor may be configured to read the content of the at least three registers and determine the logic level of the majority of bits of the at least three registers via software instructions executed by the further microprocessor.

BRIEF DESCRIPTION OF THE DRAWINGS

For a more complete understanding of the present disclosure and the advantages thereof, reference is now made to the following descriptions taken in conjunction with the accompanying drawings, in which:

FIG. 8 is a diagram of an embodiment processing system; and

FIGS. 9, 10, 11, 12, and 13 are diagrams of embodiments of details of the processing system.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise.

Variations or modifications described to one of the embodiments may also apply to other embodiments. Further, it should be understood that various changes, substitutions, and alterations can be made herein without departing from the spirit and scope of this disclosure as defined by the appended claims.

In the following description, numerous specific details are given to provide a thorough understanding of embodiments. The embodiments can be practiced without one or several specific details or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
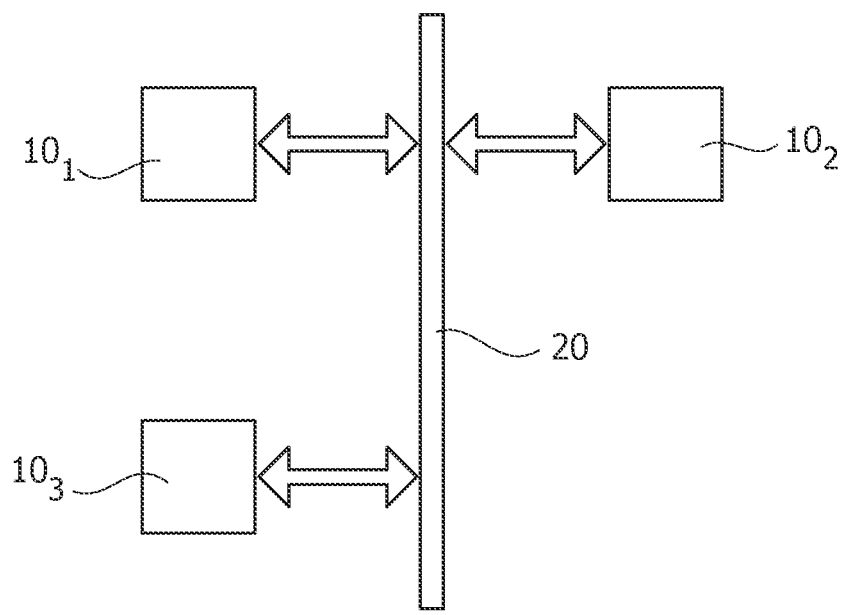
FIG. 1 is a diagram of an example electronic system.
Figure 2:
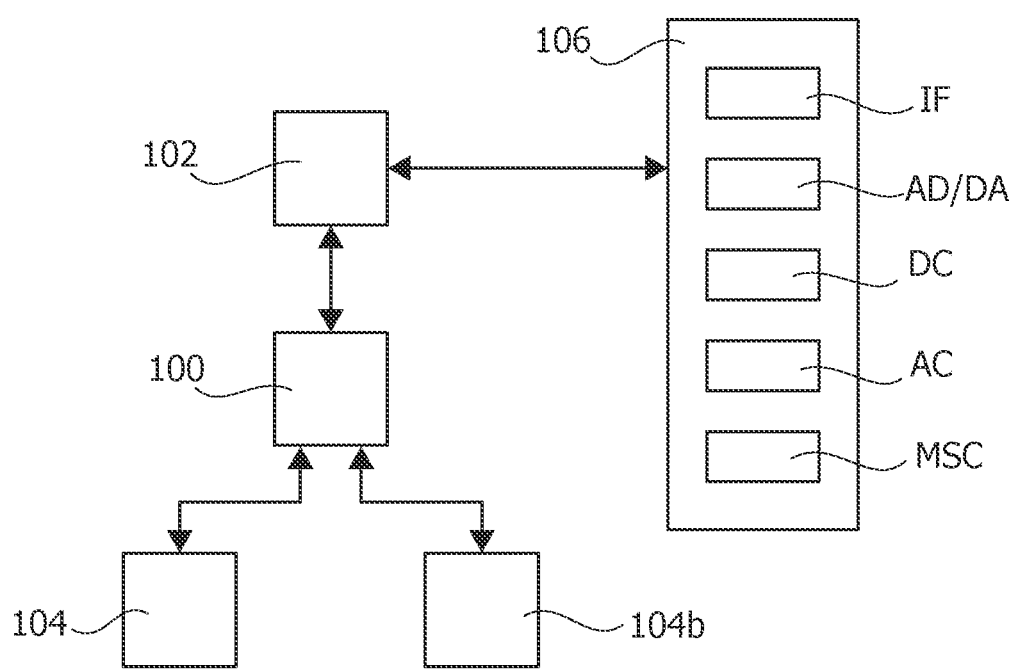
FIGS. 2 and 3 are diagrams of example processing systems.
Figure 3:
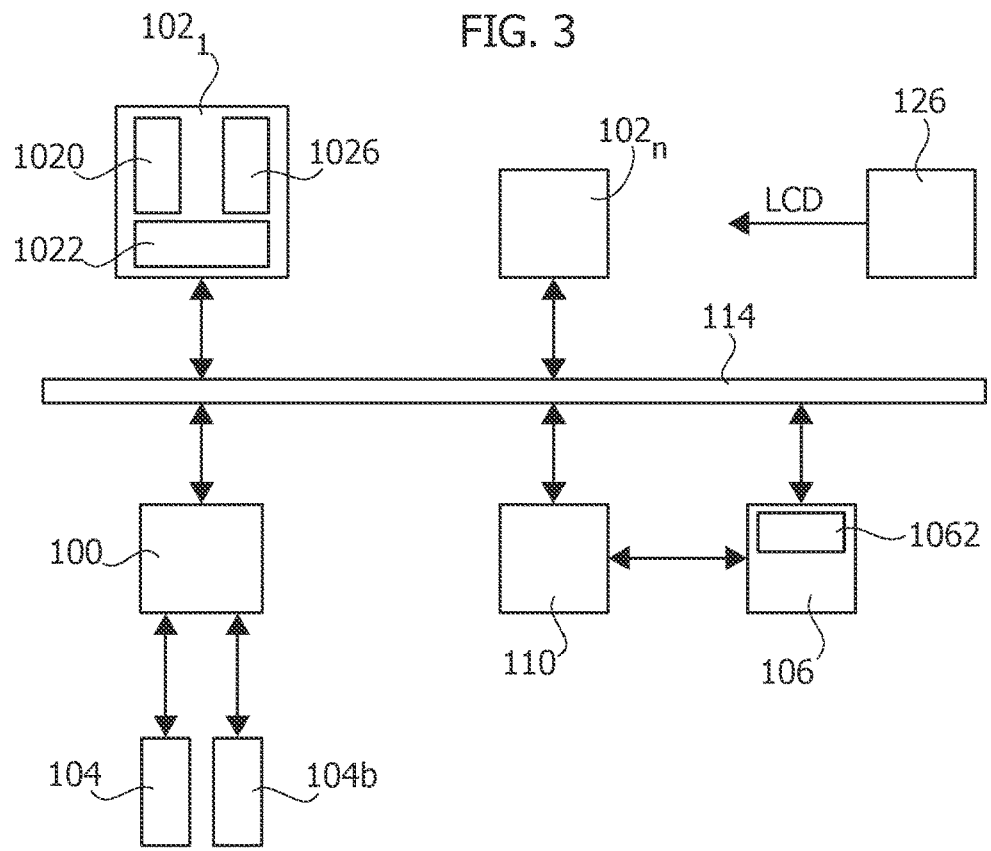

In the following FIGS. 4 to 13 parts, elements or components which have already been described with reference to FIGS. 1 to 3 are denoted by the same references previously used in such Figure; the description of such previously described elements will not be repeated in the following in order not to overburden the present detailed description.

As described in the foregoing, modern processing systems may use life-cycle data LCD to activate given security protection mechanisms (i.e., the hardware or software behavior of the processing system may change as a function of life-cycle data LCD).

Usually, the security features are not activated exclusively based of the life-cycle data LCD, but additional security configuration data SCD are used to specify whether a given security feature should be activated (e.g., once a given life-cycle stage has been reached). Typically, these security configuration data SCD are stored together with other configuration data CD to a non-volatile memory 104 (e.g., reserved memory locations of the non-volatile memory 104 configured to store the firmware of the processor(s) 102). These configuration data CD is typically read during a reset phase of the processing system by some circuit and distributed to the various components (e.g., the processing core(s) 102, the memory controller(s) 100, or the resources 106), whereby the security configuration data SCD are provided to the security framework and the security configuration data SCD are used to enable or disable the related protections also as a function of the life-cycle data LCD.

In this respect, as disclosed in document EP 4 13 194 A1, at least part of the configuration data CD, in particular the security configuration data SCD, may not be alterable anymore after being stored to the non-volatile memory. The reason is to guarantee that a certain security configuration is enforced and not alterable so that the protection is always active.

In embodiments, a conventional solution to permit a debugging/testing of the processing system involves that: the debug-interface of the processing system is disabled and access to one or more components is possible thorough the processing core 102.

Accordingly, in this way, the processing core 102 may receive commands via a communication interface IF of the processing system, such as a CAN interface, and execute given (software) operations as a function of the command received (e.g., read data from a given memory address or write data to a given memory address), where the memory addresses are associated (e.g., with given memory locations in the memory 104 or 104b, or resources 106).

In embodiments, the processing core 102 may even be configured to overwrite given security configuration data SCD, thereby disabling given security mechanisms (e.g., enabling again the debug interface).

Accordingly, the processing core 102 may implement a software debug interface (essentially a back-door), which may verify further conditions (e.g., verify whether the command includes a correct password), which are usually not implemented in hardware debug interface.

This means that, once a certain security protection is enabled, it might be necessary "to do something" (e.g., to provide a proper password) as a pre-condition to be able to run a predetermine test routine or debug the processing system. Such a password verification operation may, however, involve various operations.

In embodiments, the password has to be provided to the processing core 102 via a communication interface IF, the password has to be verified, and eventually, the result of the request has to be transmitted again via communication interface IF.

In addition, the password verification operation may also involve an encrypted password, where the processing core 102 has to forward the encrypted communication or only the encrypted password to a hardware secure module/cryptographic coprocessor of the processing system to obtain the plain-text password used for the verification operations. This means that, in some cases, some (hardware or software) cryptographic operations may be executed before the password can be used to bypass a certain security protection.

Thus, while such a software debug interface may be useful to monitor the operation of the processing system, when the processing system is normally used ("in field" stage), in case of a device failure, it may be more suitable to advance the life-cycle stage of the processing system to the failure-analysis stage (if supported), whereby the processing system itself deactivates given hardware security protections (e.g., automatically reactivates the debug interface of the processing system).

However, due to the fact that the debug interface is usually disabled in the "in field" stage, also the advancing of the life-cycle stage may only be performed via the processing core 102. Therefore, to advance the device to the Failure Analysis stage, it is necessary to execute some software via a processing core 102.

In embodiments, the processing core 102 may receive a command via a communication interface, verify a password (possibly including a cryptographic operation), and perform the operations to advance the life-cycle stage.

Accordingly, the use of a microprocessor 102 as debug interface or for advancing the life-cycle stage may be unsuitable because a significant number of resources may be involved, such as a processing core 102, the non-volaille memory 104 having stored the software executed by the processing core 102, the volatile memory 104b for storing temporary results of the processing core 102, a communication interface IF and possibly other resources 106 (such as a cryptographic co-processor).

In fact, usually, the failure-analysis stage should be started in case a processing system has a hardware failure. Accordingly, such a software approach may not be suitable because essentially all main components of the processing system are involved, and the failure of one of these components may inhibit that the processing core 102 may perform software debug operations or advance the life-cycle stage of the processing system.

Accordingly, in the following will be described solutions which permit to manage in a more efficient manner the life cycle of a processing system.

Figure 4:
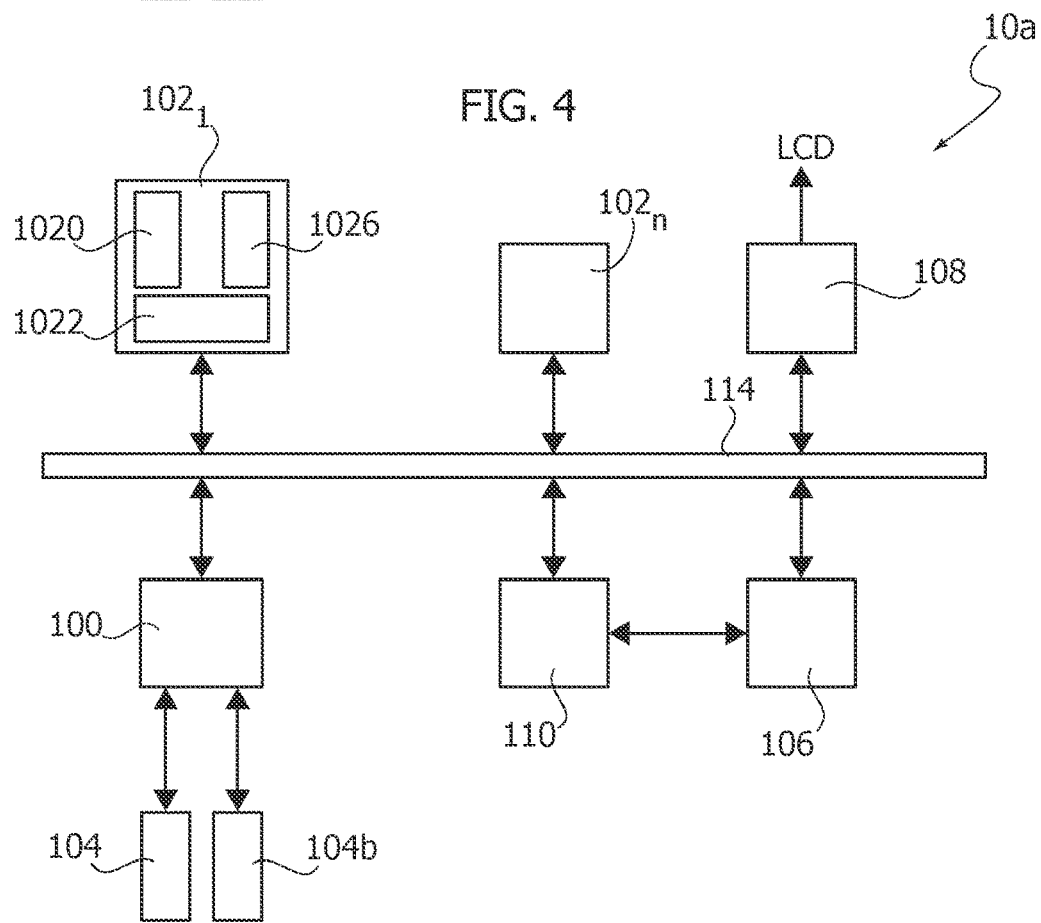
FIG. 4 is a diagram of an embodiment of a processing system.

FIG. 4 shows an embodiment of a processing system 10a according to the present description.

In embodiments, the underlying architecture of the processing system 10a corresponds to the processing system described with respect to FIGS. 2 and 3, and the respective description applies in their entirety. Thus, also, in this case, the processing system 10a, such as an integrated circuit, includes at least one processing core 102, a memory controller 100 configured to be connected to an (internal or external) non-volatile memory 104, at least one resource 106, and a communication system 114 connecting the processing core(s) 102, the memory controller 100, and the resource(s) 106.

As mentioned before, the behavior of the processing system 10a may also be varied based on a configuration data CD and life-cycle data LCD.

In embodiments, in line with the description of EP 3 413 194 A1, these configuration data CD and life-cycle data LCD may be written into specific areas of the non-volatile memory 104 and retrieved when the processing system 10a is powered on. Preferably, the non-volatile memory 104 is integrated into the integrated circuit and may also be used to store the firmware of the processing core(s) 102.

However, the firmware may also be stored in a separate non-volatile memory 104.

In embodiments, the non-volatile program memory may be used in case the program memory is integrated into the integrated circuit.

Conversely, an additional (small) internal non-volatile memory 104 may be used in case the program memory is an external memory. Accordingly, in various embodiments, the configuration data CD and the life-cycle data LCD are stored in a non-volatile memory of the integrated circuit, including the circuits requiring configuration data, such as the processor 102 or one or more of the hardware resources 106.

In embodiments, the configuration data CD may include calibration data used to guarantee that the hardware behavior is uniform, thereby compensating for possible production process tolerances.

In embodiments, this often applies to the calibration of analog components of the processing system, such as a temperature sensor, analog-to-digital converter, voltage reference, etc.

In embodiments, a voltage monitor threshold level of an analog comparator could be "trimmed" to the exact intended value by adjusting some levels with configuration/calibration data, which are written by the producer of the hardware of the processing systems (e.g, the micro-controller producer).

Moreover, the configuration data CD may also be used to customize the behavior of the hardware (e.g., the hardware resources 106), according to different application needs.

In embodiments, once the firmware of the processing system has been stored in the processing system 10a, some configuration data CD (i.e, the security configuration data SCD), may be written to deactivate the debug interface, which, for example, could be used to download the firmware of the processing system 10a. Alternatively, only the access to the non-volatile memory via the debug interface may be disabled (i.e., the debug interface as a whole may not be disabled), but the access of the debug interface to the other circuits may be limited.

Thus, generally, a first part of the configuration data CD may be written by the producer of the hardware of the processing system (e.g., the producer of an integrated circuit), or a second part of the configuration data CD may be written by the developer of the firmware of the processing system 10a.

As mentioned before, the programmed configuration data CD may be read during a reset phase, which usually starts as soon as the processing system 10a is powered on.

Specifically, as shown in FIG. 4, the processing system 10a may include for this purpose a hardware configuration circuit 108 configured to read the configuration data CD and the life-cycle data LCD from the non-volatile memory 104 and distribute these data within the processing system 10a.

In various embodiments, the hardware configuration module 108 may be configured to read the configuration data CD and the life-cycle data LCD from the non-volatile memory 104 by sending read requests to the memory controller 100 via the communication system 114. Additionally or alternatively, the hardware configuration module 108 may also be connected directly to the memory controller 100 or be configured to read directly the data from the memory 104.

Similarly, the hardware configuration module 108 may be configured to send the configuration data CD and the life-cycle data LCD to the various circuits by sending write requests via the communication system 114. However, the hardware configuration module 108 may also use a separate communication channel for the configuration data CD or the life-cycle data LCD.

Figure 5:
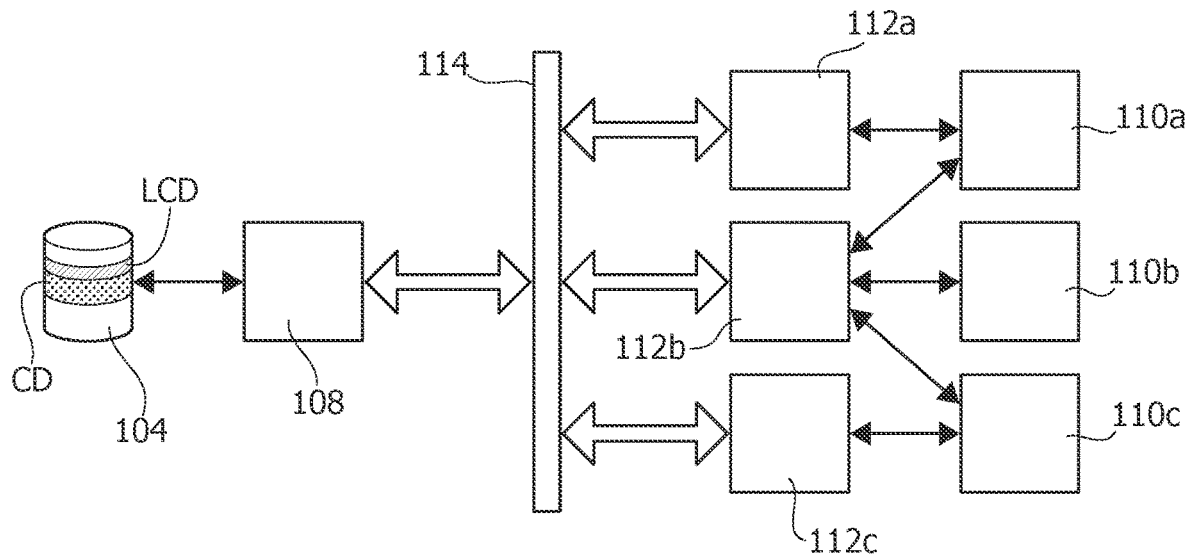
FIGS. 5 and 6 are diagrams of embodiments for distributing configuration data and life-cycle data in a processing system.

FIG. 5 shows a possible embodiment of the configuration circuit 108. The configuration data CD are stored in reserved memory areas (e.g., in the form of a plurality of consecutive memory locations). Accordingly, the configuration module 108 accesses the reserved memory areas containing the configuration data CD, reads the configuration data CD, and transmits the configuration data CD to a respective circuit 110 within the processing system 10a.

Generally, the circuit 110 may correspond to any circuit of the processing system 10a requiring configuration data and may correspond to processor 102, a hardware resource 106, or even a memory 104 or 104b.

In embodiments, circuit 110 may be a debug interface of the processing system 10a, which is enabled or disabled based on the configuration data CD. Similarly, the configuration data CD may be used to configure read or write protected areas of memory.

In embodiments, to distribute the configuration data CD, each circuit 110 may have associated a respective configuration data client 112.

In embodiments, three circuits 110a, 110b and 110c and three configuration data clients 112a, 112b and 112c are shown in FIG. 5. Generally, each configuration data client 112 may be associated univocally to a single hardware circuit 110, and provided configuration data only to the associated hardware circuit 110 (e.g., a specific hardware resource 106), or may be associated with a plurality of hardware circuits 110 (e.g., a plurality of hardware resource 106). In general, the configuration data clients 112a, 112b, and 112c may also be integrated into the respective circuit 110a, 110b, and 110c.

Accordingly, in the embodiment considered, the configuration module 108 may determine for each target circuit 110 to be configured the respective configuration data (selected from the configuration data CD) and transmit the configuration data associated with the target circuit 110 to the configuration data client 112 associated with the target circuit 110.

Similarly, while reading the configuration data CD from memory 104, the configuration module 108 may determine the target circuit(s) for the current configuration information and send the current configuration data to the configuration data client(s) associated with the respective target circuit(s).

Generally, any communication may be used for transmitting the configuration data to the configuration data client 112, including both serial and parallel communications.

In embodiments, configuration module 108 and configuration data clients 112 may be connected via the communication system 114 or an additional bus, and each configuration data client 112 may have associated a respective target address.

Accordingly, each configuration data client 112 is configured to receive the configuration data from module 108, store them into the internal register (e.g., store them into one or more internal flip-flops or latches). The data stored in the register may then be used to generate one or more signals, which influence the behavior of one or more hardware circuits 110.

Figure 6:
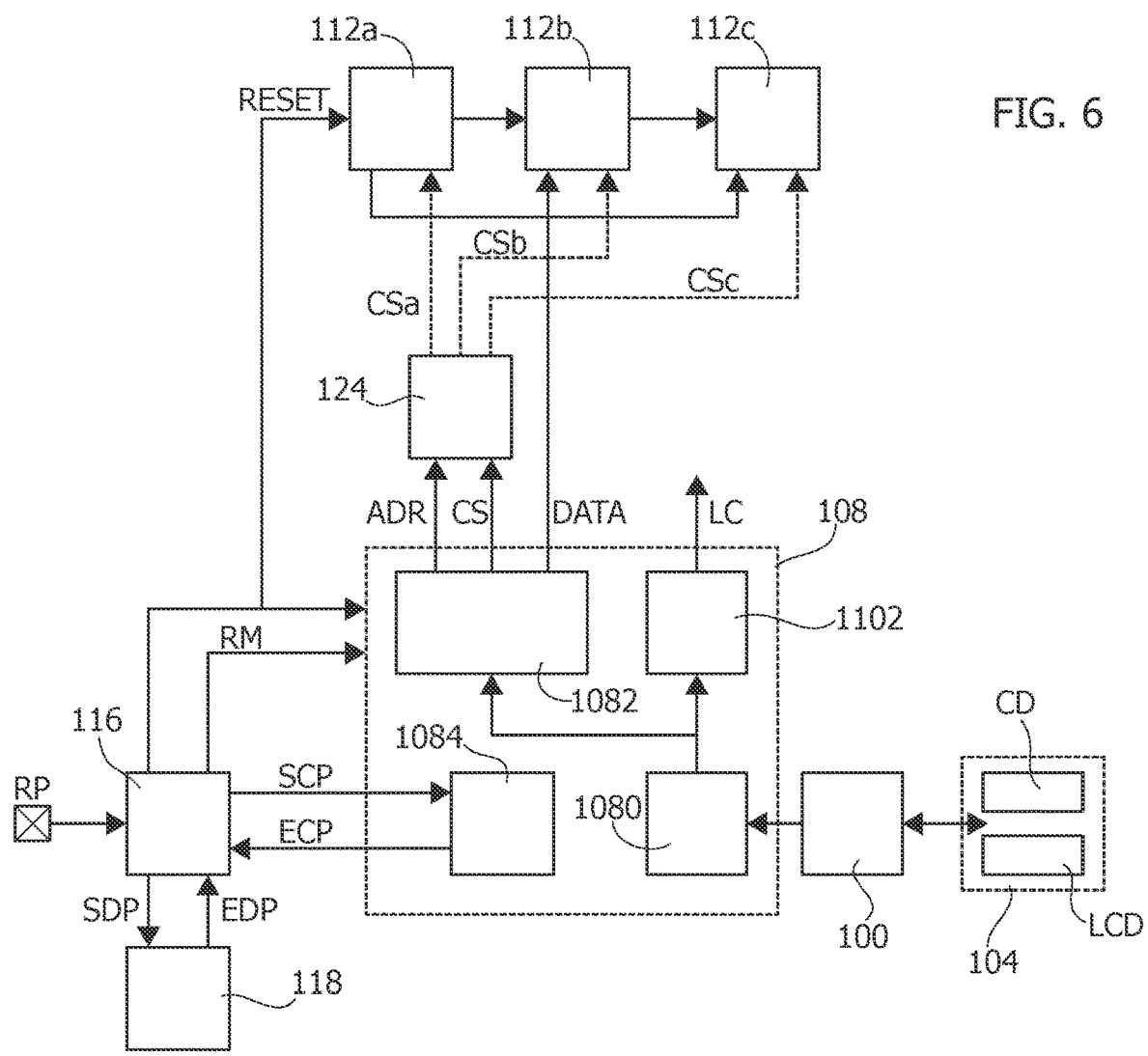

FIG. 6 shows in this respect a possible embodiment of the communication between the configuration module 108 and the configuration data clients 112. The processing system 10a includes a configuration module 108 configured to read the configuration data CD from one or more non-volatile memories 104 and a plurality of configuration data clients 112 configured to receive respective configuration data from the module 108 and distribute them among a plurality of circuits 110 (not shown) requiring configuration data.

In embodiments, each configuration data client 112 may be associated univocally with a respective circuit 110.

In embodiments, the processing system 10a includes the three configuration data clients 112a, 112b, and 112c.

The configuration module 108 includes a data read module 1080 configured to read the configuration data CD from the memory 104 and a dispatch module 1082 configured to transmit the configuration data to the configuration data clients 112.

As mentioned before, any communication may be used to communicate between the dispatch module 1082 and the configuration data clients 112.

In embodiments, the communication between the dispatch module 1082 and the configuration data clients 112 is based on data frames in accordance with a given format, called in the following Device Configuration Format (DCF).

In embodiments, each data frame includes two fields: the payload (i.e., the real data), called DCF Format payload, and possibly additional data attributes used to identify the receiver of the data, called DCF Format attributes, where the receiver is one of the configuration data clients 112 representing a DCF client.

In embodiments, the data attributes may consist of 16 or 32 bits, where a given number of bits specifies the address of one of the configuration data clients 112, and the payload may consist of 16 or 32 bits.

In embodiments, the data read module 1080 is configured to read circuits of 64 bits from memory 104, where the first 32 bits contain the data attributes (including the address of a configuration data client) and the second 32 bits contain the configuration data to be transmitted to the address specified in the data attributes. As mentioned before, the address may correspond to a physical address of the communication system 114 or of a separate communication bus.

Each configuration data client/DCF client 112 may be a hardware module, usually including a combinational circuit configured to store the received data in an internal register implemented (e.g., with flip-flops/latches), thereby permitting to distribute, via one or more internal signals generated as a function of the data stored in the internal register, the configuration data received to various parts of the associate hardware circuit(s) 110.

In embodiments, each configuration data client 112 may have associated a univocal address (i.e., univocal within each processing system 10a) and analyses the data transmitted by the dispatch module 1082 to determine whether the additional data attributes (DCF Format attributes) contain the address associated with the configuration data client 112.

In various embodiments, module 108 may also includes a state control module 1084 configured to manage the various configuration phases of the processing system 10a.

In embodiments, once the processing system 10a is switched-on, a reset module 116 of the processing system 10a may generate a reset signal RESET, which is used to perform a reset of the various components of the processing system 10a.

In embodiments, the reset signal RESET may correspond to a reset pulse of a given number of clock cycles, provided to the circuits 110 of the processing system 10a.

In embodiments, the reset signal RESET may be used by the configuration data clients 112 to set the internal register to a given reset value.

Similarly, in response to a reset, the reset circuit 116 may activate the state control module 1084, thereby activating the configuration phase. Specifically, during the configuration phase, the data read module 1080 may read the configuration data CD from memory 104. The dispatch module 1082 may send the configuration data CD to the various configuration data clients 112, thereby overwriting the reset values.

In embodiments, the dispatch module 1082 may generate a data signal DATA having a given number of bits (corresponding to the bits of the payload) containing the configuration data to be transmitted to a given configuration data client 112 and further control signals for selecting the target configuration data client 112.

In embodiments, the dispatch module 1082 also generates an address signal ADR containing the address of the target configuration data client 112 and optionally a chip select signal CS used to signal that the address signal ADR and the data signal DATA are valid.

In embodiments, the address signal ADR (and the chip select signal CS) is provided to a decoder 124 configured to activate one of the configuration data clients 112 as a function of the address signal ADD.

In embodiments, the decoder 124 sets a chip select signal CSa to indicate that the configuration data client 112a should read the data signal DATA when the address signal ADR corresponds to an address assigned to the configuration data client 112a (and the chip select signal CS is set).

In embodiments, the decoder 124 may set a chip select signal CSb to indicate that the configuration data client 112b should read the data signal DATA when the address signal ADR corresponds to an address assigned to the configuration data client 112b (and the chip select signal CS is set), etc.

Accordingly, the configuration data CD may also include security configuration data SCD used to activate or deactivate given security functions of the processing system 10a, such as: the external access to a debug interface; the (read or write) access to given memory locations, etc.

Moreover, the configuration data CD may include two sub-sets of configuration data a first group of configuration data (e.g., calibration data) written by the producer of the processing system 10a (e.g., the chip manufacture) and a second group of configuration data written during a later stage, such as configuration data written by the firmware developer or a system integrator, such as the producer of an Engine Control Unit.

In various embodiments, these groups of configuration data are written to different areas of the memory(ies) 104, thereby permitting that these groups may be configured independently, or the second group of configuration data may be appended to the first group of configuration data.

In embodiments, the security configuration data SCD included in the first group of configuration data may also permit to set the access rights to the memory locations in which the first group of configuration data are stored.

In embodiments, the first group of configuration data may not be overwritten, or the memory interface may inhibit read access to the first group of configuration data (e.g., the processor 102).

Conversely, the configuration data CD/security configuration data SCD included in the second group of configuration data may be used to configure the behavior of the circuits 110 from a functional point of view (e.g., to enable or disable the debug interface, etc.). Thus, once the debug interface is deactivated or the respective memory locations are protected, the second group of configuration data may not be overwritten or read.

Similarly, the data read module 1080 may also read the life-cycle data LCD from memory 104 and provided to a life-cycle circuit 1102.

In embodiments, the life-cycle circuit 1102 may include an internal register, in which the life-cycle data LCD read from memory 104 are stored. More specifically, in various embodiments, the life-cycle circuit 1102 is configured to receive encoded life-cycle data LCD, decode the life-cycle data LCD into decoded data LC identifying a current life-cycle stage, i.e., the data LC identifying a current life-cycle stage may be stored in the life-cycle circuit 1102 and provided to the other circuits.

In embodiments, this operation may be managed by the state control module 1084 (e.g., the state control module may drive the life-cycle module 1102), such that the life-cycle module 1102 decodes the life-cycle data LCD and stores the decoded data LC in the internal register (e.g., when the processing system 10a is in the configuration phase—following the reset state).

The life-cycle circuit 1102 may then provide the decoded life-cycle data LC to the various circuits 110. Preferably, a separate communication channel is used to provide the same decoded life-cycle data LC to the various circuits 110 because it may be rather useless to use additional registers (e.g., in the configuration data clients 112) for storing the information already stored in the register of the life-cycle circuit 1102.

Accordingly, in various embodiments, the hardware configuration circuit 108 is configured to read (via a suitable communication channel) the configuration data CD and the life-cycle data LCD from the non-volatile memory 104 and transmit the configuration data CD and the decoded life-cycle data LC to the various circuits 110 (e.g., the processing core(s) 102, the memory controller 100 and the resources 106).

Specifically, based on the control implemented in the state control circuit 1084, for example, in the form of a sequential logic circuit implementing a state machine, the hardware configuration circuit reads the configuration data CD and the life-cycle data LCD after a reset, but before the processing core(s) 102 are activated.

As disclosed in European patent application n. EP 3 719 636 A1, which is incorporated herein by reference in its entirety, two types of resets may be used in conventional processing systems. The first reset corresponds to a "simple" reset as described essentially in the foregoing, where some kind of reset event activates the internal reset stage 116 to perform a functional reset of the processing system. The second type of reset corresponds to a complex reset where further operations may be executed.

Figure 7:
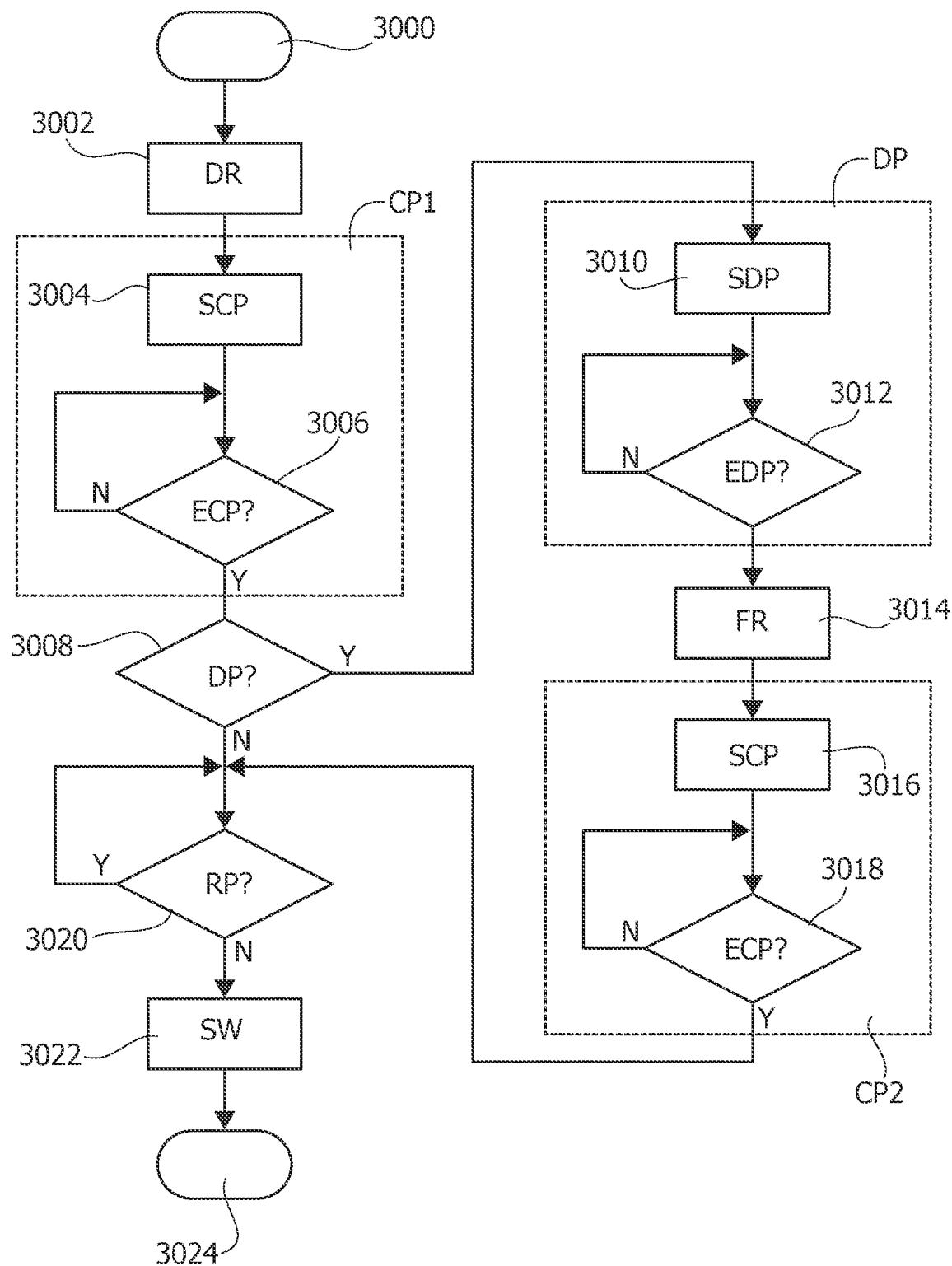
FIG. 7 is a flow-chart of an embodiment method for the operation of the processing system.

FIG. 7 schematically shows an embodiment of the operation of the reset circuit 116.

At step 3000 the reset is activated, and a reset is performed at step 3002.

In embodiments, the reset module 116 may set the signal RESET at step 3002. Accordingly, in response to the reset requested at step 3002, the various latches/registers of the processing system 10a are reset (e.g., the content of the configuration data clients 112 and the configuration module 108).

Next, the reset module 116 starts at step 3004, the configuration phase, for example, by setting a signal SCP, which is provided to the state control module 1084. In response to the signal SCP, the configuration circuit 108 reads and distributes the configuration data CD and the life-cycle data LCD. Generally, the signal SCP is purely optionally because the configuration phase could be started automatically when the reset signal RESET is de-asserted.

At the end of the configuration phase, configuration circuit 108 may set a signal ECP to indicate that the configuration phase is completed.

Accordingly, as shown in FIG. 7, the reset circuit 116 may proceed from step 3004 to a verification step 3006. The reset module 116 waits until the signal ECP is set by the configuration circuit 108 (output "N" of the verification step 3006). Once the signal ECP is set (output "Y" of the verification step 3006), the processing system 10a is configured. Accordingly, steps 3004 and 3006 implement a configuration phase CP1 of the processing system 10a.

Accordingly, in general, after the verification step 3006, the processing core(s) 102 may be started at step 3022, and the reset procedure may terminate at step 3024. Accordingly, step 3022 is started as a software runtime phase SW.

However, as shown in FIG. 7, the processing system 10a may also be configured to run a diagnostic phase DP where the processing system 10a executes one or more optional system diagnostic operations (i.e., the processing system 10a executes a Built-In Self-Test (BIST)).

In embodiments, the processing system 10a includes a hardware diagnostic circuit 118, which is activated via a signal SDP.

Accordingly, in various embodiments, once the signal ECP is set (output "Y" of the verification step 3006), the reset circuit 116 may set the signal SDP at step 3010, thereby starting the diagnostic circuit 118. Next, the reset module 116 may wait at step 3012 until the diagnostic operations have been executed (i.e., the self-test has been completed).

In embodiments, the diagnostic circuit 118 may set a signal EDP once the diagnostic operations have been executed.

Accordingly, the reset circuit 116 may proceed from step 3010 to a verification step 3012. The reset module 116 waits until the signal EDP is set by the diagnostic circuit 118 (output "N" of the verification step 3012). Once the signal EDP is set (output "Y" of the verification step 3012), the diagnostic phase DP (steps 3010 and 3012) has been completed.

In various embodiments, the self-test operations executed by the diagnostic circuit 118 may test one or more registers of the processing system 10a, which usually involves write or read operations, thereby modifying the content of such registers may be modified.

Accordingly, in various embodiments, once having executed the diagnostic phase DP, the reset module may execute a further reset of the processing system 10a at step 3014.

In embodiments, the reset circuit 116 may again set the signal RESET at step 3014.

Generally, the reset executed at step 3002, representing a first reset, and the reset executed at step 3016, representing a second reset, may be different, for example, with respect to the registers or circuits which are reset by the reset circuit 116.

In embodiments, the reset circuit 116 generates a reset mode signal RM, which is set to a first logic level at step 3002 and a second logic level at step 3014. However, the reset circuit could also set a first reset signal RESET1 at step 3002 (used to reset a first sub-set of circuits) and a second reset signal RESET2 at step 3014 (used to reset a second sub-set of circuits).

In various embodiments, the diagnostic circuit 118 may also test the registers of the configuration data clients 112 and the life-cycle circuit 1102. Accordingly, in this case, it is also useful to read the configuration data CD or life-cycle data LCD at a second configuration phase CP2.

Accordingly, in various embodiments, the reset module 116 may proceed from step 3014 to step 3016, where the reset circuit 116 starts a configuration phase, for example, by setting a signal SCP, which is provided to the state control module 1084. In response to the signal SCP, the configuration circuit 108 reads and distributes the configuration data CD and the life-cycle data LCD. At the end of the configuration phase, configuration circuit 108 sets the signal ECP to indicate that the configuration phase is completed.

Accordingly, the reset circuit 116 may proceed from step 3016 to a verification step 3018, where the reset module 116 waits until the signal ECP is set by the configuration circuit 108 (output "N" of the verification step 3018). Once the signal ECP is set (output "Y" of the verification step 3018), the processing circuit may thus proceed to step 3022 for starting the processing core(s) 102.

In embodiments, the reset circuit 116 may be configured to optionally start the diagnostic phase DP after the configuration phase CP1. This configuration may be hardwired or programmable. Specifically, the configuration data CD are already distributed at the end of the configuration phase CP1. Accordingly, the configuration data CD may also include data indicating whether the self-test function should be activated or not, possibly including data specifying which self-test should be executed.

In embodiments, these data may be provided to the reset circuit 116 or diagnostic circuit 118 by associating respective configuration data clients 112 with these circuits.

Accordingly, at the end of step 3006, the reset circuit 116 may proceed to a verification step 3008. Specifically, when the execution of the diagnostic phase DP is enabled (output "Y" of the verification step 3008), the reset module 116 proceeds to step 3010. Conversely, when the execution of the self-test is disabled (output "N" of the verification step 3008), the procedure may directly proceed to step 3022 to start the normal-operation mode of the processing system.

Thus, a simple reset implements only a single reset (step 3002) and the configuration phase CP1. Conversely, a complex reset implements the diagnostic phase DP, the further reset at step 3014, and optionally the further configuration phase CP2. Generally, the processing system 10a may support both types of resets, where a complex reset is executed in response to a first set of events and a simple reset is executed in response to a second set of events (e.g., verified at step 3008).

In embodiments, a complex reset may be executed in response to a start-up of the processing system 10a or in response to given (critical) errors, while a simple reset may be executed in response to a reset request by the processor 102. Generally, the reset events may be static/hardwired or may be configurable.

Typically, the first reset at step 3002 is called "destructive reset" DR, because usually all registers of the processing system 10a are reset to a reset value, while the second reset at step 3014 is usually identified as a functional reset FR, because not necessarily all registers of the processing system are reset, such as registers of one or more of the resources 106.

In embodiments, the registers of the reset module 116 cannot be reset at step 3016, because otherwise the reset module 116 would lose the information whether already a first reset at step 3002 had been performed.

Generally, in case the BIST does not test the registers of the configuration data clients 112 and the life-cycle module 1102, the functional reset at step 3014 may also be a so called "Short Functional Reset," where the processing system 10a is reset but the configuration circuit 108 does not read again the configuration data CD and the life-cycle data LCD (i.e., the configuration phase CP2) may be omitted.

In this respect, given events (such as a power-on of the processing system 10a) may trigger the complex reset procedure shown in FIG. 7 (starting at a destructive reset 3002), while other events (e.g., a reset requested by a resource 106) may trigger only a functional reset (i.e., start immediately step 3016).

Moreover, further events (e.g., a reset requested by a processor 102) may trigger only a short functional reset. Typically, the reset triggers are classified as functional, short functional, or destructive at design time or may be configured via configuration data CD. Similarly, as mentioned before, the execution of the BIST may be set at design time or may be configured via configuration data CD, possibly for each trigger associated with a destructive reset.

Accordingly, in various embodiments, when executing a complex or simple reset (i.e., between steps 3002 and 3020), the processing core(s) 102 are not running (i.e., the processing core(s) 102 do not execute any software).

In embodiments, this may be obtained by keeping the processing core(s) 102 under reset. Conversely, other circuits of the processing system 10a may be operative, for example, the reset circuit 116, the diagnostic circuit 118, the hardware configuration circuit 108, the non-volatile memory 104, one or more of the resources 106, etc.

In embodiments, at least the circuits 104, 108, and 116 are used to manage the reset phase, including the configuration phase(s) and diagnostic phase, of the processing system 10a, and thus ensure that the configuration data CD and the life-cycle data LCD are available once the processing core(s) 102 are activated at step 3022.

In this respect, the reset circuit 116 or the state control module 1084 may also implement further steps, such as an initialization phase, where the reset circuit 116 or the state control module 1084, for example, waits that the non-volatile memory 104 completes its initialization, thereby ensuring that the data read circuit 1080 may read the configuration data CD and life-cycle data LCD from the non-volatile memory 104.

In various embodiments, the reset circuit 116 is configured to reset the processing system 10a in response to a signal received via a reset terminal RP of the processing system 10a, such as a pad of a respective integrated circuit die or a pin of a respective packaged integrated circuit.

For example, this is schematically shown in FIG. 6. Moreover, in various embodiments, the reset circuit 116 is configured to verify at step 3030 (before proceeding to step 3022) as to whether the signal applied to the reset terminal RP is de-asserted.

In embodiments, the processing system 10a may be configured to start a complex reset at step 3000 when the signal applied to the reset terminal RP has a first logic value, for example, low. Next the reset circuit executes steps 3002 to 3018, and the processing system 10a remains at step 3020 while the signal applied to the reset terminal RP has the first logic level (output "Y" of the verification step 3020) (i.e., the processing system 10a proceeds from step 3020 to step 3022 (output "N" of the verification step 3020)) when the logic level of the signal applied to the reset terminal RP has a second logic level, for example, high. Accordingly, in the embodiment considered, the processing core(s) is only started at step 3022 when the signal applied to the reset terminal RP has the second logic level.

Moreover, in various embodiments, at least one communication interface IF_JTAG, preferably a serial communication interface, such as a JTAG (Joint Test Action Group) interface, is operative during step 3020.

Accordingly, in various embodiments, after the configuration data CD and the life-cycle data LCD are read, it is possible to stretch the reset phase by keeping the reset terminal RP at the first logic level (e.g., low). This makes it possible to keep the processing system 10a under reset and during this phase send, via the interface IF_JTAG, such as a JTAG interface, one or more commands.

Generally, while FIG. 7 shows an embodiment where the various reset phases are managed by the reset circuit 116, these phases could also be managed by the state control circuit 1084 or another state machine. Thus, in general, the operation shown in FIG. 7 may be implemented in any suitable manner by the processing system 10a.

The inventors have observed that the above-described behavior may be used to manage, via the interface IF_JTAG, preferably a serial communication interface, such as a JTAG interface, the advancing of the life-cycle stage, without requiring the intervention of the processing core(s) 102.

In various embodiments, the processing system 10a is configured to enable or disable given security functions as a function of life-cycle data LCD and optional security configuration data SCD.

In embodiments, the life-cycle data LCD may identify one of a plurality of life-cycle stages, such as "production" (LC1), when the processing system 10, for example, a micro-controller, is in the chip fabric; "customer delivery" (LC2), when the processing system 10 has been shipped to the 1st tier customer (e.g., a producer of an engine control unit); "OEM production" (LC3), when the device has been shipped to a next-level customer (e.g., a car maker); "in field" (LC4), when the device is installed in the final product (e.g., in a car sold in the market); "failure analysis" (LC5), when the device is shipped back (e.g., to the producer of the processing system 10 or the hardware or software developer) for diagnostic purposes.

Generally, what is relevant for the present application is that at least three life-cycle stages are managed: one or more development phases, as identified, for example, via the stages LC1, LC2, and LC3; the "in field" stage LC4; and the "failure analysis" stage LC5.

Specifically, in various embodiments, during the development phase(s), one or more security mechanisms may already be activated, and during the "in field" stage, a maximum level of protection is activated. Conversely, in the "failure analysis" stage, one or more of the security mechanisms activated during the "in field" stage are deactivated.

Generally, it is not particularly relevant, which bit sequence identifies a given life-cycle stage.

In embodiments, the life-cycle data LCD may include a given number of bits, such as 32 or 64 bits, and a sub-set of a plurality of bits may be associated with each life-cycle stage, such as 4 or 8 bits. In this case, the life-cycle circuit 108 may be configured to read the life-cycle data LCD; determine for each subset of bits whether the majority of bits has the reset value of the non-volatile memory 104; determine the highest life-cycle stage, which has the majority of bits not set to the reset value of the non-volatile memory 104; and set the signal LC to indicate this highest life-cycle stage.

Generally, the first life cycle LC1 may be identified by life-cycle data LCD having all bits set to the reset value of the non-volatile memory.

In embodiments, assuming life-cycle data LCD with 32 bits with the following sub-sets of bits: [0 . . . 7]: LC2; [8 . . . 15]: LC3; [16 . . . 23]: LC4; [24 . . . 31]: LC5.

Moreover, assuming that the reset value of a given bit of the non-volatile memory corresponds to "1". Accordingly, in this case, the first life-cycle stage LC1 is identified when all bits are set to "1," and a given further life-cycle is assumed to be reached when at least five bits (i.e., the majority) of the respective sub-set of bits is set to "0". Amongst these life-cycle stages, the life-cycle circuit 1102 selects then the highest life-cycle stage, for example, sets the signal LC to indicate the life-cycle stage LC5, when at least five bits of the subset of bits [24 . . . 31] are set to "0".

However also other encoding schemes may be used for the life-cycle data LCD. In fact, the encoding of the life-cycle data LCD has to be configured, such that the life cycle stage may only advance (i.e., it can never be reverted to an early stage).

FIG. 8 shows an embodiment of a processing system 10a according to the present disclosure.

Specifically, the embodiment is essentially based on the embodiment shown in FIG. 4 and includes in addition a communication interface IF_JTAG, preferably a serial communication interface, such as JTAG interface, connected to one or more terminals of the processing system 10a (not shown), such as pins or pads of a respective integrated circuit, to receive one or more requests REQ from an external device, such as an external debug device; and a verification circuit 130 configured to analyze the request REQ and determine whether the request REQ indicates a request for advancing the life-cycle stage of the processing system 10a.

Accordingly, in the embodiment considered, the verification circuit 130 is a separate hardware circuit and the advancing of the life-cycle stage may be requested without an intervention of the processing core(s) 102. Specifically, in various embodiments, the verification circuit 130 is configured to manage only the advancing of the life-cycle stage to the failure analysis stage LC5, while the advancing of the other life-cycle stages (LC1-LC4) may still be managed by the processing core(s) 102, for example, by receiving respective requests via a CAN interface.

Accordingly, in embodiments, the verification circuit 130 generates a signal LCFA_REQ when the request REQ indicates a request to advance the life-cycle stage to the failure analysis stage LC5.

More specifically, this signal LCFA_REQ is directly provided to the non-volatile memory 104 having stored the life-cycle data LCD, thereby avoiding that the communication has to be transmitted through the communication channel 114.

For example, FIG. 9 shows an embodiment of the non-volatile memory 104 according to the present disclosure. Specifically, in the embodiment considered, the non-volatile memory 104 includes one or more physical non-volatile memory areas 1048, such as a plurality of flash memory banks; and a control circuit 1040.

Specifically, in various embodiments, the control circuit 1040 includes a security management circuit 1042 and a read and write management circuit 1044 configured to manage read and write requests addressed to given memory areas of the non-volatile memory areas 1048.

Generally, as shown in FIG. 9, the read and write management circuit 1044 may include two separate circuits a read management circuit 1044r configured to manage read requests and a write management circuit 1044w configured to manage write requests.

Accordingly, in the embodiment considered, the memory controller 100 receives a read or write request from the communication system 114 and forwards the request to the control circuit 1040. Generally, while shown separately, the memory controller 100 may also form part of the control circuit 1040.

Specifically, in various embodiments, the control circuit 1040, in particular the security management circuit 1042, is configured to determine whether the read or write request is permitted.

In embodiments, the security management circuit 1042 may determine whether the read or write request may access a given memory area based on configuration data CD, in particular the security configuration data SCD, or the life-cycle data LCD.

In embodiments, the control circuit 1040 may have associated a respective configuration data client 112 (with a respective address) and the security configuration data SCP may be provided to the security management circuit 1042 by storing the security configuration data SCP together with the configuration data CD in the non-volatile memory 104, where the security configuration data SCP are stored in the memory 104 in the form of DCF data packets also including the address of the configuration data client 112 associated with the control circuit 1040. Accordingly, in this way, configuration circuit 108 will read the configuration data CD and transmit the respective security configuration data SCP to the configuration data client 112 associated with the control circuit 1040.

In case the security management circuit 1042 determines that the request is permitted, the security management circuit 1042 forwards the request to the read and write management circuit 1044 (1044r or 1044w), which executes the read or write request.

Moreover, in the embodiments considered, the control circuit 1040 includes a life-cycle program circuit 1046, which is configured to generate a write request to a given memory location of the memory areas 1048 when the signal LCFA_REQ is set. In various embodiments, the life-cycle program circuit 1046 may also verify one or more further conditions COND1, which will be described in greater detail in the following.

Additionally or alternatively, as shown in FIG. 10, also the verification circuit 130 may generate the signal LCFA_REQ not only as a function of the request REQ, but also as a function of one or more conditions COND2.

Accordingly, the verification circuit 130 and the life-cycle program circuit 1046 permit to advance the life-cycle stage to the failure analysis stage by using a minimum set of device resources, and bypassing all the protection layers described so far, for example, the security management circuit 1042. Accordingly, the advancement of the life-cycle stage to the failure analysis stage (and preferably only to this stage) may be accomplished separately with a reduced quantity of circuits involved, thereby reducing the risk that the malfunction of a circuit at the advancement of the life-cycle stage.

In embodiments, this mechanism may still guarantee the needed level of security to ensure that the advancement cannot be done maliciously, and also the needed level for safety and availability, so that the life-cycle cannot advance to the failure analysis stage during the run-time of the processing system 10a.

Accordingly, in the embodiments shown in FIGS. 8, 9, and 10, two circuits are involved: a first circuit 130 (external with respect to the non-volatile memory 104) acting as an initiator of the advancement to the failure analysis stage, which is configured to verify several conditions (in particular the content of the request REQ and the additional conditions COND2) and generate a signal LCFA_REQ indicating an (authorized) request to advance the life-cycle stage to the failure analysis stage; and a second circuit 1046 (internal with respect to the non-volatile memory 104), which executes the programming of the non-volatile memory 104 as a function of the signal LCFA_REQ.

Figure 11:
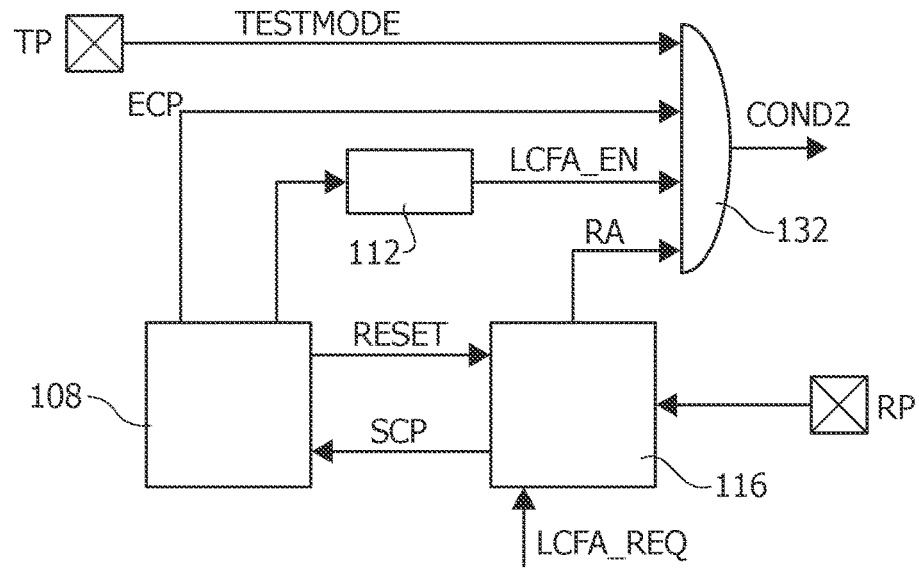
Figure 12:
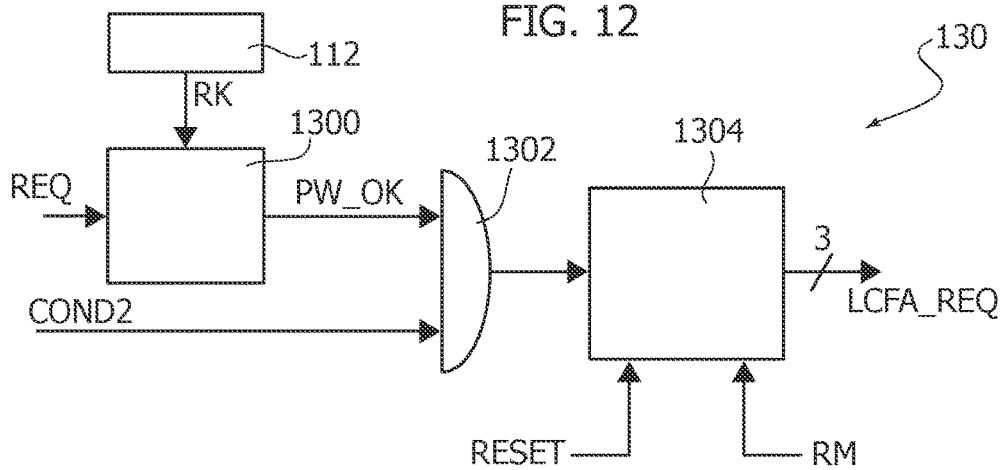

FIGS. 11 and 12 show a possible embodiment of the verification circuit 130. Specifically, FIG. 11 shows an embodiment of a circuit configured to verify the additional conditions COND2 of the verification circuit 130. However, in general, the respective circuit may also be integrated directly within the verification circuit 130.

Specifically, as shown in FIG. 12, the verification circuit 130 is configured to receive: the request REQ provided by the communication interface IF_JTAG; and additional conditions COND2 (as shown in FIG. 11).

Specifically, in various embodiments, the set of input conditions is chosen to guarantee security, safety, and availability, for example, these conditions have to ensure that 1) the operation cannot be started by mistake when the processing system 10a is in use (availability protection), 2) it is not be possible to maliciously start the operation (security protection), and 3) the operation can only be executed while the processing system 10a is in a safe state (safety protection).

In embodiments, the first condition is verified by monitoring a signal TESTMODE applied to a terminal TP, such as a pin or pad of a respective integrated circuit.

In embodiments, the terminal TP (and thus the signal TESTMODE) is connected to a first logic level, for example, high, when the processing system 10a is in use. Conversely, to ensure that the processing system 10a is not in use, but in a laboratory environment, the verification circuit 130 may verify whether the signal TESTMODE applied to the terminal TP has a second logic level, for example, low.

In embodiments, to set the pin TP to low, the processing system 10a has to be removed from the application, for example, the engine control unit, and connected to some test board. In various embodiments, the terminal TP may also be connected via a pull-up resistor to a supply voltage (i.e., the logic high level), which ensures that an accidental break of the wire connecting the package pin or ball to the pad will not leave the pad at an undefined state. Generally, a pull-down resistor would be used in case the signal TESTMODE is active high (i.e., the test-mode is activated when the terminal TP is connected externally to a logic high level).

In various embodiments, the second condition (security) is verified by providing within the verification circuit 130 a password verification circuit 1300 configured to verify whether the request REQ contains a reference password/keyword RK. Generally, due to the fact that it is assumed that the processing system 10a is now in a laboratory environment, it is preferable that the password is submitted in the request REQ in plain-text, thus avoiding the need for complex cryptographic operations. Accordingly, in various embodiments, the circuit 1300 is configured to generate a signal PW_OK when the request REQ provided via the communication interface IF_JTAG corresponds to a given predetermined bit sequence including the reference keyword RK.

In embodiments, the reference password RK may be hard-wired or stored in the configuration data CD.

In embodiments, the verification circuit 130 may have associated a respective configuration data client 112 (with a respective address) and the reference password RK may be provided to the verification circuit 130 by storing the reference password RK together with the configuration data CD in the non-volatile memory 104, where the reference password RK is stored in the memory 104 in the form of DCF data packets also including the address of the configuration data client 112 associated with the verification circuit 130. Accordingly, the configuration circuit 108 reads the configuration data CD and transmits the respective reference password RK to the configuration data client 112 associated with the verification circuit 130.

In embodiments, for a possible implementation of the password verification circuit may be cited European patent application n. EP 3 432 190 A1, which is incorporated herein by reference.

In various embodiments, the third condition (safety) is verified by ensuring that the processing system 10a is in the reset state because this is considered by the ISO26262 standard as a safe state.

Specifically, as described in the foregoing with respect to FIG. 7, by applying a given logic level (e.g., low) to a reset terminal/pin/pad RP, the reset circuit 116 will start the reset procedure at step 3000. Accordingly, the reset circuit 116 executes the reset and configuration phase CP1 (and optionally the diagnostic phase DP and configuration phase CP2). Moreover, the reset circuit 116 remains at step 3020 until the logic level at the reset terminal/pin/pad RP is set to a second logic level (e.g., high).

In embodiments, the communication interface IF_JTAG is active during step 3022, thus permitting that requests REQ may be sent via the interface IF_JTAG. Because the communication interface IF_JTAG is usually also active when the processing core(s) are running, the verification circuit 130 is thus configured to determine whether the reset circuit 116 is at step 3022.

In embodiments, the verification circuit 130 receives a signal RA from the reset circuit 116, indicating that the reset module 116 is waiting at step 3022. In various embodiments, the verification circuit 130 may also monitor the signal ECP, indicating that the configuration phase has been completed.

In embodiments, the signal RA may also correspond to the signal at the terminal RP (or its inverted version). The verification circuit 130 may verify the signal RM in various embodiments, which distinguishes the first reset phase from the second reset phase.

The verification circuit 130 may verify whether a given flag is set in various embodiments, which enables or disables the described operation for advancing the life-cycle stage.

In embodiments, the verification circuit 130 monitors a signal LCFA_EN provided by a configuration data client 112 associated with the verification circuit 130. Accordingly, the signal LCFA_EN may be generated by storing a respective DCF data packet with the address of this configuration data client to the configuration data CD.

In the embodiment shown in FIGS. 11 and 12, the aforementioned conditions are verified by generating the signal COND2 via a combinational logic circuit 132 as a function of the signals TESTMODE, ECP, LCFA_EN, and RA. Conversely, the verification circuit 130 generates the signal LCFA_REQ via a combinational logic circuit 1302 as a function of the signals PW_OK and COND2. Thus, in general, the combinational logic circuits 132 and 1302 may also be combined.

In various embodiments, the signal LCFA_REQ is stored to a register 1304, preferably a plurality of redundant registers/flip-flops, such as three parallel flip-flops.

Accordingly, in various embodiments, the signal LCFA_REQ is only set when: the life-cycle advancement to the failure analysis stage is enabled via the signal LCFA_EN; the processing system 10a is under reset, as indicated, for example, via the signal RA; the configuration data CD and the life-cycle data LCD have been read, as indicated, for example, via the signal ECP; the request REQ corresponds to a valid request, for example, the correct password RK has been included in the request REQ, as verified via the circuit 1300/indicated via the signal PW_OK; and the terminal/pin/pad TP has been set to the correct level indicating the test-mode.

Accordingly, in the embodiment considered, a user may set the signal LCFA_REQ by setting the logic levels at the terminals TP and RP, and sending via the communication interface IF_JTAG a given request REQ (with the reference keyword RK) once the configuration phase CP2 has been completed. In fact, because the processing core(s) 102 are not yet started, such a request cannot be provided via software, which during this phase is not executed.

Specifically, in various embodiments, the register(s)/flip-flop(s) 1304 are only reset in response to the reset generated at step 3002 but not in response to the reset at step 3014.

As shown in FIG. 12, the register/flip-flop 1304 may be configured to: reset the signal LCFA_REQ when the signal RESET is set and the signal RM has the first logic level set at step 3002 (e.g., high); and inhibit the reset of the signal LCFA_REQ when the signal RESET is set and the signal RM has the second logic level set at step 3016 (e.g., low).

Alternatively, the register/flip-flop 1304 may be reset only in response to the reset signal RESET1 (generated at step 3002/destructive reset DR) and not the reset signal RESET2 (generated at step 3016/functional reset FR).

In various embodiments, the signal LCFA_REQ is also provided to the reset circuit 116. The operation of this feedback will be described in greater detail in the following with respect to the life-cycle program circuit 1046.

Before going into the details of the life-cycle program circuit 1046, it is worthwhile to briefly describe how data may be programmed to a non-volatile memory, such as a flash memory.

Generally, writing data to a non-volatile memory is more complex than writing data to a RAM, where one single write instruction moves some data directly in the RAM and the data is then immediately latched in the memory. Conversely, in the case of the non-volatile memory, the programming usually requires a sequence of operations.

In embodiments, to program a non-volatile memory, it may be required that the supply voltage of the memory is set to a higher voltage. This may involve a given time until the voltage settles to the new value. Similarly, the higher voltage should be removed once the programming operation is completed. Moreover, a single programming/write operation may involve a complex sequence of micro-operation to control the whole programming operation. The reason is that for the non-volatile memory, undesired analog effects, which can be different depending on the non-volatile memory technology being used, might hinder the successful completion of the programming operation.

In embodiments, in the case of a Flash memory, a cell might become "depleted," which is a condition where the cell has lost its trapped charge; in such a case, the cell drives an excessive flow of current along its connected bit-line, and it would be extremely difficult to recover the cell and bring it to a programmed state. And, dedicated algorithms might be needed to restore a depleted cell.

Accordingly, typically, a processing core 102 has to execute a sequence of operations to write data to the non-volatile memory 104.

In embodiments, a processing core 102 may be configured to execute the following steps for programming data to the non-volatile memory 104: 1) configure the non-volatile memory 104 so that it is in a programming mode, 2) provide the data to be programmed (via the memory controller 100) to the non-volatile memory 104, 3) set the supply voltage of the non-volatile memory 104 to a higher (write) voltage, 4) wait until the programming operation is completed, 5) set the supply voltage of the non-volatile memory 104 to a lower (read) voltage, 6) perform a read operation of the non-volatile memory 104 (via the memory controller 100) to verify whether the data have been programmed correctly, and 7) configure the non-volatile memory 104 so that it is in the normal operation mode.

Typically, the above operations are performed by sending via software instructions requests from the processing core 102 to the control circuit 1040.

In embodiments, the control circuit 1040 may also manage a register interface, where each register (such as a write data register, a read data register, an address register, and a control register) may have associated a respective address.

In embodiments, during the fourth step the real programming operation of the memory area 1048 is performed. The software may wait until the non-volatile memory 104 has completed the programming during this step. From the software point of view, this is just a simple wait step, but in reality, during this timeframe, the non-volatile memory 104 executes a complex sequence of micro-operations, like giving a short voltage pulse, then comparing the current cell with a reference cell, give another pulse if the current is not the target one and so on. Often an unbalance ratio in the cell V-I (voltage-current) characteristic is applied between the cell being programmed and the reference, so that the end of the operation, which is marked by the fact that the current of the programmed cell has reached a sufficient distance from the current of the reference cell, gives even more margin (in terms of current distance between the programmed and the reference cell) when an unbalanced V-I ratio is used during a read operation. Those of skill in the art will appreciate that this is a simplification of the programming operation of the non-volatile memory, and in reality, the internal sequence of operations might be more complex, depending on the type of technology adopted for the non-volatile memory.

Accordingly, the write management circuit 1044w has to execute a sequence of micro-operations to implement the programming operation.

For this purpose, the write management circuit 1044w may be implemented with a hardware finite state machine or a microprocessor being programmed via software instructions.

In embodiments, the microprocessor may have associated a programmable voltage source for setting the supply voltage of the memory areas 1048 and an analog-to-digital converter for monitoring the voltage of a given cell of the memory area 1048, etc.

In embodiments, the use of a microprocessor is particularly useful to permit an improvement of the programming operation.

In embodiments, such a microprocessor permits to use different sequences (at least during the development stage) or updates the different sequence even later. Such sequences of micro-operations, executed by a microprocessor, is typically called "embedded-algo".

Hence, a microprocessor provides more flexibility than a fixed state machined. Such a microprocessor may only be used to manage the more complex write operations, while the read operation may still be performed via a dedicated hardware circuit 1044r. In fact, while a microprocessor provides more flexibility, such a microprocessor usually has a higher power-consumption than a dedicated hardware circuit. For this reason, the microprocessor (but a similar issue may also exist for a complex state machine 1044w managing the write operation) is typically switched off (or at least suspended) during read operations. In fact, during run-time, the non-volatile memory 104 is mainly read and rarely written.

In embodiments, when a processing core 102 activates the programming mode of the non-volatile memory 104, this step may switch on the write circuit/microprocessor 1044w of the non-volatile memory 104.

However, this may imply that also the life-cycle programming circuit 1046 has to activate in some way the write circuit 1044w, for example, the respective microprocessor. In fact, as mentioned before, usually the control circuit 1040 activates the write circuit 1044w only in response to one or more commands received from the memory controller 100.

In embodiments, the control circuit 1040 is configured to activate the write circuit 1044w only when: a first request is received, where the first request activates the programming mode, for example, by setting a bit of a control register of the control circuit 1040; and a second request is receiver, where the second request provides the data to be written, for example, by storing the data to a write-data register of the control circuit 1040.

In embodiments, this permits to avoid that the write circuit 1044w is activated due to an erroneous (isolated) first request or second request.

Accordingly, in various embodiments, also the life-cycle programming circuit 1046 has to activate in some way write circuit 1044w to program the non-volatile memory areas 1048. Accordingly, the life-cycle programming circuit 1046 could execute the above-mentioned operations for starting the write circuit 1044.

Conversely, in various embodiments of the present disclosure the above-described feedback of the signal LCFA_REQ to the reset circuit 116 is used for this purpose.

Specifically, in various embodiments, during a destructive or functional reset at steps 3002 or 3014, also the circuit implementing the write circuit 1044w, such as a microprocessor or a state machine, is activated, for example, to execute several internal initializations, and then the circuit is deactivated, i.e., in various embodiments, the circuit implementing the write circuit 1044w is activated in response to the reset generate at step 3002 and the reset generated at step 3014, and once the non-volatile memory 104 is initialized, the circuit implementing the write circuit 1044 is deactivated.

However, as described with respect to FIG. 7, following the reset at step 3002, the reset circuit 116 activates the configuration phase CP1 during which the configuration data CD and life-cycle data LCD are read. Only once the configuration data have been read, possibly also executing the diagnostic phase DP, the further reset 3014, and the further configuration phase CP2, it is possible to maintain the processing system 10a in the reset stage via the signal at the reset terminal RP. Thus, when the request REQ may be sent via the communication interface IF_JTAG and the verification circuit 130 verified the request REQ and the additional conditions COND2, the circuit implementing the write circuit 1044w may be already deactivated.

In this respect, as mentioned before, the register(s)/flip-flops(s) 1304 are configured to be reset only in response to the reset at step 3002/destructive reset DR, while the register(s)/flip-flops(s) 1304 maintain their values in response to a reset at step 3014/functional reset FR. Thus, the circuit implementing the write circuit 1044w may be activated by starting a functional reset FR at step 3014, i.e., the reset circuit 116 is configured to start a functional reset at step 3014 in response to the signal LCFA_REQ being set. Optionally, the reset circuit 116 may also verify additional conditions, such as the logic level of the terminal TP or the terminal RP (see the respective description of the verification circuit 130).

Accordingly, when starting the reset procedure at step 3014, the register(s)/flip-flops(s) 1304 are not reset, but the circuit implementing the write circuit 1044w is activated.

Accordingly, in various embodiments, the circuit implementing the write circuit 1044w may be configured to verify the signal LCFA_REQ when the circuit is activated, for example, in response to a reset. Moreover, in response to determining that the signal LCFA_REQ is set, the write circuit 1044w may perform the programming of the life-cycle data LCD in the memory area 1048 to advance the life-cycle stage to the failure analysis stage.

Specifically, once the processing system 10a is switched on, the reset circuit 116 will execute the reset at step 3002 and start the configuration phase CP1 (and optionally the diagnostic phase DP, the second reset at step 3014, and the second configuration phase CP2). Accordingly, when the circuit implementing the write circuit 1044w is initialized in response to the reset at step 3002 (and optionally the reset at step 3014), the signal LCFA_REQ is not set (e.g., is low).

Next, when the verification circuit 130 sets the signal LCFA_REQ, this signal will also trigger a new reset at step 3014. Specifically, as mentioned before, in the embodiment considered, register 1304 maintains its content during the reset at step 3014.

Thus, when the circuit implementing the write circuit 1044w is initialized in response to the reset at step 3014, the signal LCFA_REQ is now set (e.g., is high).

Figure 13:
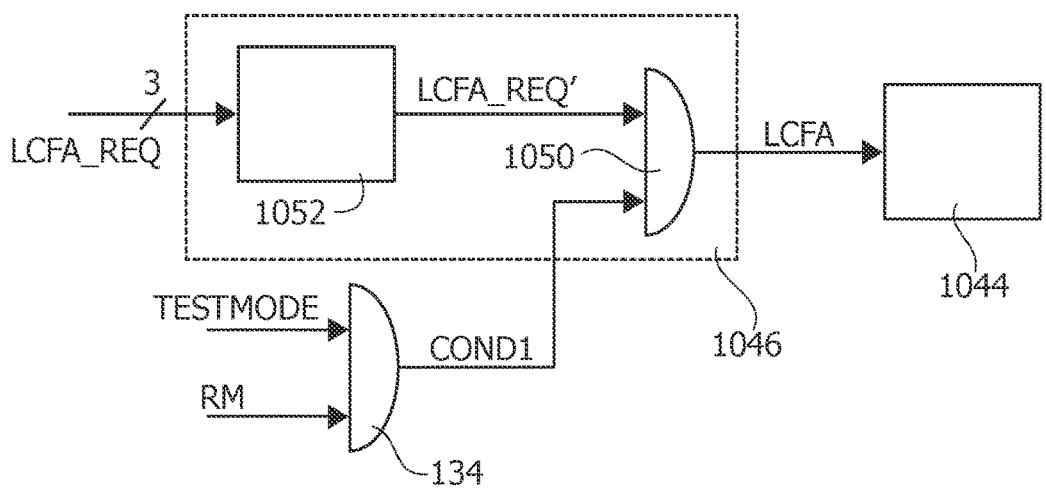

FIG. 13 shows in this respect a possible embodiment of the programming circuit 1046. Generally, as mentioned before, the signal LCFA_REQ may also be provided directly to the write circuit 1044 (i.e., the programming circuit 1046 is purely optional).

However, as shown in FIG. 13, the additional programming circuit 1046 may be used: in case the signal LCFA_REQ is provided by a plurality of registers/flip-flops, to generate via a circuit 1052 a signal LCFA_REQ' by combining the signals LCFA_REQ, for example, by setting the signal LCFA_REQ' to the bit value of the majority of the values of the signals LCFA_REQ, such as a triple-vote decision; or to determine via circuits 134 and 1050 a signal FCFA not only as a function of the signal LCFA_REQ (or the signal LCFA_REQ') but also as a function of one or more optional further conditions COND1.

In embodiments, the programming circuit 1046 may verify via the combinational logic circuits 134 and 1050 at least one of the logic level of the terminal TP (i.e., the signal TESTMODE) or the terminal RP (see the respective description of the verification circuit 130); or whether the circuit implementing the write circuit 1044 has been activated in response to the functional reset FM at step 3014, for example, by verifying the logic value of the signal RM.

In embodiments, the programming operation of the life-cycle data LCD is only started, when the write circuit determines during an initialization phase, for example, via the programming circuit 1046, the following conditions: the majority of bits of the signal LCFA_REQ are set; and the signal TESTMODE applied to the terminal TP is set.

Generally, while not shown in FIG. 13, the signal LCFA_REQ, LCFA_REQ' or LCFA may be provided to a register interface of the microprocessor 1044w, for example, the so-called Special-Function Registers (SFR) of the microprocessor implementing the write circuit 1044w. Generally, while the verification of the additional conditions COND1 is shown via hardware combinational circuits 134 or 1050, at least part of these verifications may be performed via software instructions. Similarly, the operation of the (voting) circuit 1052 may be performed via software instructions executed by the microprocessor 1044.

Generally, even in a software implementation a dedicated voting circuit 1052 may be used because the signal LCFA_REQ' may be used to signal the reset request to the reset module 116 (i.e., the reset circuit 116 may be configured to start the functional reset in response to the signal LCFA_REQ' (rather than the signal LCFA_REQ)).

In embodiments, a similar voting circuit may be implemented directly in the reset circuit 116.

Accordingly, in various embodiments, circuit 1052 may correspond to the register interface of the microprocessor implementing the write circuit 1044w, thereby providing directly the signals LCFA_REQ (provided by the registers 1304) to the microprocessor.

Preferably the voting of the signals LCFA_REQ and at least the combination with the additional conditions at circuit 1050 (and optionally also the operation of circuit 134) is performed directly via software instructions. The reason to have all signals LCFA_REQ mirrored into respective register bits (e.g., 3) of the microprocessor 1044 is to protect this mechanism from a spurious activation, which would be catastrophic for the application because the device will enter the failure analysis stage, where the application would not run anymore.

However, in various embodiments, the microprocessor within the non-volatile memory 104 is not classified as an ASIL-D component, according to ISO26262 specification, and it can eventually fail. Conversely, an ASIL-D microprocessor would cost additional area and power. Thus, by reading a plurality of separate bits of the signal LCFA_REQ and implementing the voting via software instructions, such as a triple-vote decision, the probability to have a failure is significantly reduced.

As mentioned before, when the functional reset at step 3014 is triggered in response to the signal LCFA_REQ, the non-volatile memory 104 starts its own initialization again and during this time the request for advancing the life-cycle stage to the failure analysis stage is activated because the signal LCFA_REQ maintains its value.

In this respect, no additional information is required to advance the life-cycle stage to the failure analysis stage, because the memory location of the life-cycle data LCD in the non-volatile memory 1048 is fixed and the signature to be programmed to advance the life-cycle stage to the failure analysis stage is also fixed. As described in the foregoing, it is not particularly relevant how the life-cycle data LCD are encoded.

In embodiments, it is sufficient that a given bit sequence is associated with a sub-set of bits associated with the failure analysis stage. Accordingly, by programming the respective subset of bits, the life-cycle stage may be advanced to the failure analysis stage, irrespective of the previous life-cycle stage. However, when using more complex encoding schemes, the write circuit 1044 could also read first the old life-cycle data LCD.

Generally, once the write circuit 1044 has completed the programming of the life-cycle data LCD, it is required that the processing circuit 10a reads again the life-cycle data LCD. However, it is also necessary to reset the signal(s) LCFA_REQ.

In embodiments, this is achieved by performing a new reset starting at step 3000, thus executing at step 3002 a reset of the register(s) 1304.

Generally, the new reset may also be performed manually (e.g., once having sent the correct request REQ), the user may wait a given time, for example, more than 1 s, whereby the write circuit 1044w completes the programming operation of the life-cycle data LCD; de-assert the signal at the reset terminal RP; and assert the signal at the reset terminal RP again, thereby starting a new reset at step 3000.

Thus, in various embodiments, the advancement of the lift-cycle stage may involve 1) activating a destructive reset via the terminal RP (step 3002); 2) in response to the destructive reset DR, the configuration module 108 reads the configuration data CD and life-cycle data LCD (configuration phase CP1), and optionally performs the other operations until step 3020; 3) once the configuration phase CP1 and optionally CP2 has been terminated, the verification circuit is activated; 4) to have sufficient time to submit the request, the reset terminal remains set (step 3020); 5) the request REQ is submitted with the correct password; 6) once the request REQ is verified, the signals LCFA_REQ are set; 7) the signals LCFA_REQ are used to generate a functional reset of the processing system 10a (step 3016); 8) in response to the functional reset, the circuit implementing the write circuit 1044w is activated and executes its initialization; 9) the circuit implementing the write circuit 1044w reads the signals LCFA_REQ during the initialization; 10) the write circuit 1044w or programming circuit 1046 verifies whether the majority of the bits of the signals LCFA_REQ are set; 11) due to the fact that the signals LCFA_REQ are set, the write circuit 1044w writes the life-cycle data LCD to advance to the failure analysis stage; and 12) a new destructive reset is started manually or automatically (step 3002).

Generally, instead of activating the circuit implementing the write circuit 1044w indirectly by generating a reset in response to the signal(s) LCFA_REQ (or the signal LCFA_REQ'), the circuit implementing the write circuit 1044w may also be activated in other ways in response to setting the signal(s) LCFA_REQ.

In embodiments, the circuit implementing the write circuit 1044w may be activated directly in response to the signal(s) LCFA_REQ or the signal LCFA_REQ', for example, by configuring the respective signal(s) as wake-up signals of the circuit implementing the write circuit 1044w.

Accordingly, the present disclosure proposes a new scheme to easily advance a failing device to the failure analysis stage, bypassing most of the circuitry ordinarily involved for advancing the life-cycle stage. By adopting the solution proposed, the advancement to the failure analysis stage is guaranteed with a higher probability compared to the standard methodology of life cycle programming via application software. The solution adopted does not compromise the overall security as it allows the life-cycle advancement only upon a successful challenge of a secret password. In addition, the proposed solution does not compromise the safety, because the operation is executed only during the reset phase, which is considered by ISO26262 standard a safe state. Finally, the proposed solution does not include the availability because a set of conditions are put in place to avoid any spurious activation of the live-cycle advancement.

Of course, without prejudice to the principle of the invention, the details of construction and the embodiments may vary widely with respect to what has been described and illustrated herein purely by way of example, without thereby departing from the scope of the present invention, as defined by the ensuing claims.

While in the foregoing has been described a mechanism to advance the life-cycle stage to the failure analysis stage, modern processing systems may alternatively or additionally include a test life-cycle stage. Compared to the failure analysis stage, the test life-cycle stage has usually a reduced influence on the overall security. Thus, instead of advancing to the failure analysis stage, the write circuit 1044 could also advance to the test life-cycle stage. In fact, what is relevant for the present disclosure is that a separate mechanism is used to advance the life-cycle stage to a stage where reduced security mechanisms are active than in the in-field stage.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A processing system, comprising:
a microprocessor configured to execute software instructions;
a hardware circuit configured to change operation as a function of a decoded life-cycle data;
a reset circuit configured to, in response to determining that an external reset signal received via a reset terminal has a first logic level, cause the reset circuit to:
generate a first reset of the processing system during a reset phase,
activate a hardware configuration circuit during a configuration phase, wherein the hardware configuration circuit reads an encoded life-cycle data stored in a non-volatile memory, decodes the encoded life-cycle data, and provides the decoded life-cycle data to the hardware circuit, and
starting the microprocessor in response to determining that the external reset signal has a second logic level during a wait phase;
a communication interface activated during the wait phase and configured to receive a request; and
a hardware verification circuit configured to generate a life-cycle advancement request signal in response to determining that the request includes a reference password and the reset circuit is in the wait phase, the life-cycle advancement request signal indicating a request to advance the life-cycle stage to a given predetermined life-cycle stage as indicated by the encoded life cycle data.

2. The processing system of claim 1, wherein the non-volatile memory includes a write circuit configured to write one or more bits of the encoded life-cycle data stored in the non-volatile memory in response to determining that the life-cycle advancement request signal is set, the writing causing an advancing the life-cycle stage to the given predetermined life-cycle stage.

3. The processing system of claim 2, further comprising a test-mode terminal configured to receive an external test-mode signal, and wherein the hardware verification circuit is configured to generate the life-cycle advancement request signal only when the external test-mode signal has a given logic level.

4. The processing system of claim 2, further comprising at least three registers, wherein the life-cycle advancement request signal is stored in the at least three registers.

5. The processing system of claim 4, wherein the write circuit is implemented with a state-machine configured to:
read contents of the at least three registers; and
in response to determining that the majority of bits are set, write the one or more bits of the encoded life-cycle data stored in the non-volatile memory.

6. The processing system of claim 5, wherein the state-machine is one of a hardware state-machine or a second microprocessor, wherein the at least three registers are implemented with a register interface of the second microprocessor, and wherein the second microprocessor is configured to read contents of the at least three registers and determine a logic level of the majority of bits of the at least three registers via software instructions executed by the second microprocessor.

7. The processing system of claim 5, wherein the reset circuit is configured to monitor an internal reset signal and, in response to determining that the internal reset signal is set, generate a second reset of the processing system, wherein the at least three registers are configured to be reset in response to the first reset and maintain values stored by the at least three registers in response to the second reset, and wherein the internal reset signal corresponds to the life-cycle advancement request signal.

8. The processing system of claim 7, wherein the state-machine is configured to be activated in response to the first reset and the second reset generated by the reset circuit, and wherein the state-machine is configured to read contents of the at least three registers in response to being activated.

9. The processing system of claim 1, further comprising a plurality of configuration data clients, each configuration data client having a register for storing configuration data, wherein the non-volatile memory is configured to store the configuration data, and wherein the hardware configuration circuit is configured to read the configuration data from the non-volatile memory and transmit the configuration data to the plurality of configuration data clients during the configuration phase.

10. The processing system of claim 9, wherein the hardware verification circuit is configured to receive an enable flag from a configuration data client, and wherein the hardware verification circuit is configured to generate the life-cycle advancement request signal only when the enable flag has a given logic level.

11. The processing system of claim 9, wherein the hardware verification circuit is configured to receive the reference password from a configuration data client.

12. The processing system of claim 1, wherein the communication interface is a serial communication interface.

13. The processing system of claim 1, wherein the communication interface is a Joint Test Action Group (JTAG) interface.

14. A device, comprising a plurality of processing systems, each processing system comprising:
a microprocessor configured to execute software instructions;
a hardware circuit configured to change operation as a function of a decoded life-cycle data;
a reset circuit configured to, in response to determining that an external reset signal received via a reset terminal has a first logic level, cause the reset circuit to:
generate a first reset of the processing system during a reset phase,
activate a hardware configuration circuit during a configuration phase, wherein the hardware configuration circuit reads an encoded life-cycle data stored in a non-volatile memory, decodes the encoded life-cycle data, and provides the decoded life-cycle data to the hardware circuit, and
starting the microprocessor in response to determining that the external reset signal has a second logic level during a wait phase;
a communication interface activated during the wait phase and configured to receive a request; and
a hardware verification circuit configured to generate a life-cycle advancement request signal in response to determining that the request includes a given reference password and the reset circuit is in the wait phase, the life-cycle advancement request signal indicating a request to advance the life-cycle stage to a given predetermined life-cycle stage indicated by the encoded life cycle data.

15. The device of claim 14, wherein the device is a vehicle.

16. The device of claim 14, wherein each processing system is connected to another via a communication system.

17. The device of claim 14, wherein the non-volatile memory includes a write circuit configured to write one or more bits of the encoded life-cycle data stored in the non-volatile memory in response to determining that the life-cycle advancement request signal is set, the writing causing an advancing the life-cycle stage to the given predetermined life-cycle stage.

18. A method for operating a processing system, comprising:
generating, by a reset circuit, a first reset of the processing system during a reset phase in response to determining that an external reset signal received via a reset terminal has a first logic level,
activating, by the reset circuit, a hardware configuration circuit during a configuration phase, wherein the hardware configuration circuit reads an encoded life-cycle data stored in a non-volatile memory, decodes the encoded life-cycle data, and provides the decoded life-cycle data to a hardware circuit, the hardware circuit changing operation as a function of a decoded life-cycle data; and
starting a microprocessor of the processing system in response to determining that the external reset signal has a second logic level during a wait phase;
activating a communication interface during the wait phase;
receiving a request during the wait phase; and
generating, by a hardware verification circuit, a life-cycle advancement request signal in response to determining that the request includes a given reference password and the reset circuit is in the wait phase, the life-cycle advancement request signal indicating a request to advance the life-cycle stage to a given predetermined life-cycle stage indicated by the encoded life cycle data.

19. The method of claim 18, further comprising writing, by a write circuit, one or more bits of the encoded life-cycle data stored in the non-volatile memory in response to determining that the life-cycle advancement request signal is set, the writing causing an advancing the life-cycle stage to the given predetermined life-cycle stage.

20. The method of claim 18, further comprising:
applying the first logic level to the reset terminal of the processing system, wherein the reset circuit executes the reset phase, the configuration phase, and the wait phase; and
sending the request via the communication interface of the processing system, the request including the given reference password, wherein the hardware verification circuit generates the life-cycle advancement request signal.

* * * * *